US012242432B2

(12) United States Patent
Lutz

(10) Patent No.: US 12,242,432 B2
(45) Date of Patent: Mar. 4, 2025

(54) GUIDING A GENERATIVE MODEL TO CREATE AND INTERACT WITH A DATA STRUCTURE

(71) Applicant: Microsoft Technology Licensing, LLC, Redmond, WA (US)

(72) Inventor: Moshe Randall Lutz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/122,229

(22) Filed: Mar. 16, 2023

(65) Prior Publication Data

US 2024/0311348 A1   Sep. 19, 2024

(51) Int. Cl.
  *G06F 17/30* (2006.01)
  *G06F 16/21* (2019.01)
  (Continued)

(52) U.S. Cl.
  CPC .......... *G06F 16/211* (2019.01); *G06F 16/245* (2019.01); *G06F 16/258* (2019.01); *G06F 16/355* (2019.01)

(58) Field of Classification Search
  CPC ........ G06F 16/13; G06F 16/24; G06F 16/156; G06N 3/00; G06N 5/00; G05B 13/00
  See application file for complete search history.

(56) References Cited

U.S. PATENT DOCUMENTS 10,719,799 B1 * 7/2020 Harris .............. G06Q 10/06311
11,151,653 B1 * 10/2021 Donia ................... G06F 16/258
(Continued)

FOREIGN PATENT DOCUMENTS

WO   2019050968 A1   3/2019

OTHER PUBLICATIONS

Peng, et al., "Check Your Facts and Try Again: Improving Large Language Models with External Knowledge and Automated Feedback," in arXiv, Cornell University, arXiv:2302.12813v3 [cs.CL], Mar. 8, 2023, 15 pages.
(Continued)

*Primary Examiner* — Hung D Le

(57) ABSTRACT

A technique leverages a machine-trained pattern-completion engine to successively extract items-of-interest from unstructured data, categorize the items-of-interest, and identify relations in the unstructured data. The technique then generates a structured database based on the information it has identified. In some cases, the items-of-interest represent facts expressed by the unstructured data. The technique also leverages the structured database to perform various application tasks. In one approach, in the course of answering a query, the technique extracts supplemental information from the structured database. The technique then feeds the query and the supplemental information to the pattern-completion engine, and, in response thereto, receives output information that addresses the query. In some cases, the query is part of lengthy prompt information. Here, the technique first involves creating the structured database based on the prompt information, and then presenting the supplemental information extracted from the structured database and the query to the pattern-completion engine.

20 Claims, 14 Drawing Sheets

(51) Int. Cl.
*G06F 16/245* (2019.01)
*G06F 16/25* (2019.01)
*G06F 16/355* (2025.01)

(56) References Cited

U.S. PATENT DOCUMENTS

| | | | | |
|---|---|---|---|---|
| 2008/0208830 | A1* | 8/2008 | Lauckhart | G06F 16/332 |
| 2016/0162582 | A1* | 6/2016 | Chatterjee | G06F 16/248 |
| | | | | 707/706 |
| 2016/0217112 | A1* | 7/2016 | Carter | G06F 40/143 |
| 2016/0239617 | A1* | 8/2016 | Farooq | G16H 10/60 |
| 2016/0371238 | A1* | 12/2016 | Heavenrich | G06F 40/186 |
| 2017/0031742 | A1* | 2/2017 | Jilani | G06F 11/079 |
| 2017/0069043 | A1* | 3/2017 | Doyle | G06F 16/248 |
| 2017/0091859 | A1* | 3/2017 | Mohammad | G06F 16/2365 |
| 2017/0139903 | A1* | 5/2017 | Small | G06F 40/30 |
| 2017/0147540 | A1* | 5/2017 | McCormick | G06F 40/194 |
| 2017/0147541 | A1* | 5/2017 | Lashley | G06F 40/151 |
| 2018/0330331 | A1* | 11/2018 | Nair | G06Q 10/1053 |
| 2018/0365229 | A1* | 12/2018 | Buhrmann | G06N 5/022 |
| 2018/0374580 | A1* | 12/2018 | Gupta | G16H 50/30 |
| 2019/0095868 | A1* | 3/2019 | Zhang | G06Q 50/01 |
| 2019/0102342 | A1* | 4/2019 | Wang | G06F 7/14 |
| 2020/0026797 | A1* | 1/2020 | Weinstein | G06F 16/353 |
| 2020/0097711 | A1* | 3/2020 | Venkateswaran | G06V 30/413 |
| 2020/0226325 | A1* | 7/2020 | Mishra | G06F 40/295 |
| 2020/0273078 | A1* | 8/2020 | Xu | G06Q 30/04 |
| 2020/0380072 | A1* | 12/2020 | Deshmukh | G06N 3/084 |
| 2020/0380964 | A1* | 12/2020 | Kang | G06F 40/35 |
| 2020/0394203 | A1* | 12/2020 | Sinha | G06F 16/258 |
| 2021/0004385 | A1* | 1/2021 | Vijayalakshmi | G06F 16/258 |
| 2021/0042307 | A1* | 2/2021 | Mustafi | G06N 5/04 |
| 2021/0042309 | A1* | 2/2021 | Mustafi | G06F 16/258 |
| 2021/0073257 | A1* | 3/2021 | Newey | G06F 16/35 |
| 2021/0133207 | A1* | 5/2021 | Grewal | G06F 16/258 |
| 2021/0279235 | A1* | 9/2021 | He | G06F 16/243 |
| 2021/0382944 | A1 | 12/2021 | Li et al. | |
| 2021/0398624 | A1* | 12/2021 | Baum | G06N 3/08 |
| 2022/0147379 | A1* | 5/2022 | Urias | G06F 21/53 |
| 2022/0207229 | A1* | 6/2022 | Perkins | G06F 40/30 |
| 2022/0207384 | A1* | 6/2022 | Florian | G06F 40/169 |
| 2023/0044288 | A1* | 2/2023 | Gopalakrishnan | |
| | | | | G06F 16/24564 |
| 2023/0072311 | A1* | 3/2023 | Oliner | G06F 16/3332 |
| 2023/0186360 | A1* | 6/2023 | Loi | G06Q 30/0625 |
| | | | | 705/26.41 |
| 2023/0197210 | A1* | 6/2023 | Sutters | G16H 10/20 |
| | | | | 705/2 |
| 2023/0298708 | A1* | 9/2023 | Ikeguchi | G16H 10/20 |
| | | | | 705/3 |
| 2023/0325582 | A1* | 10/2023 | Shapiro | G06V 30/41 |
| | | | | 715/234 |
| 2024/0037345 | A1* | 2/2024 | O'Brien | G06F 40/183 |
| 2024/0054281 | A1* | 2/2024 | Bensoussan | G06F 16/353 |

OTHER PUBLICATIONS

Brown, et al., "Language Models are Few-Shot Learners," in arXiv, Cornell University, arXiv:2005.14165v4 [cs.CL], Jul. 22, 2020, 75 pages.
Radford, et al., "Language Models are Unsupervised Multitask Learners," OpenAI, San Francisco, California, 2019, 24 pages.
Vaswani, et al., "Attention is All You Need," in 31st Conference on Neural Information Processing Systems (NIPS 2017), 2017, 11 pages.
Alammar, Jay, "The Illustrated GPT-2 (Visualizing Transformer Language Models)," available at https://jalammar.github.io/illustrated-gpt2/, Github, Aug. 12, 2019, 43 pages.
PCT Search Report and Written Opinion for PCT Application PCT/US2023/081230, mailing date Feb. 15, 2024, 17 pages.
Qin, et al., "Agriculture Knowledge Graph Construction and Application," available at https://iopscience.iop.org/article/10.1088/1742-6596/1756/1/012010/pdf, in Journal of Physics, Conference Series, vol. 1756, No. 1, 012010, Feb. 6, 2021, 9 pages.

* cited by examiner

CATEGORIES
• SUBJECT-MATTER CATEGORIES
• PRIVILEGE-RELATED CATEGORIES
• AGE APPROPRIATENESS CATEGORIES
• OWNERSHIP-RELATED CATEGORIES
• ETC.

GUIDING A GENERATIVE MODEL TO CREATE AND INTERACT WITH A DATA STRUCTURE

BACKGROUND

There is a large amount of unstructured data available from various sources regarding a variety of subjects. Unstructured data is data that does not necessarily conform to any schema that specifies the kinds of data items it includes, and how those data items are organized. In some approaches, a team of users manually curate a structured database from a body of unstructured data. But this task is typically both resource-intensive and time-intensive in nature, and may fail to produce consistent results.

Automated solutions have been proposed to facilitate the generation of a structured database based on unstructured data. But some of these solutions are not adequately scalable. This means that these solutions are developed to extract particular kinds of data items in particular environments, and cannot easily be extended to other kinds of data items and other systems.

SUMMARY

A technique is described herein for solving at least the above-noted problems. By way of overview, some implementations of the technique leverage a machine-trained pattern-completion engine to (a) successively extract items-of-interest from unstructured data, (b) produce categories based on the items-of-interest, and (c) identify relations between the items-of-interest and the categories (and among the different categories). The technique generates a structured database based on the identified items-of-interest, categories, and identified relations. In some cases, the items-of-interest represent facts expressed by the unstructured data, and the categories represent subject matter-related topics.

Once produced, the technique leverages the structured database to perform various application tasks. In one task, in the course of answering a query, an application system extracts supplemental information from the structured database. The application system then feeds the query and the supplemental information to the pattern-completion engine. In response to this input information, the pattern completion engine generates output information that addresses the query. In effect, the pattern-completion engine uses the supplemental information to help it interpret the user's query.

In some cases, the query is part of lengthy prompt information that a user inputs to the pattern-completion engine. In a first phase, an application system creates a structured database based on the prompt information, with the assistance of the pattern-completion engine. In a second phase, the application system operates as described above by (a) extracting supplemental information from the structured database, and (b) presenting the query and the supplemental information to the pattern-completion engine for processing.

According to illustrative merits, the technique facilitates the task of creating structured records from unstructured data. The technique: (a) requires less time and consumes fewer computing resources compared to manual curation techniques; (b) provides more consistent results compared to manual curation techniques; and (c) scales more effectively than other automated solutions.

In the application phase, the technique improves the performance of machine-trained models, such as large language models. In particular, the technique reduces the chances that a large pattern-completion engine will generate unhelpful and/or aberrant output results. The technique also improves the ability of pattern-completion engines to properly interpret lengthy prompt information.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

Figure 1:
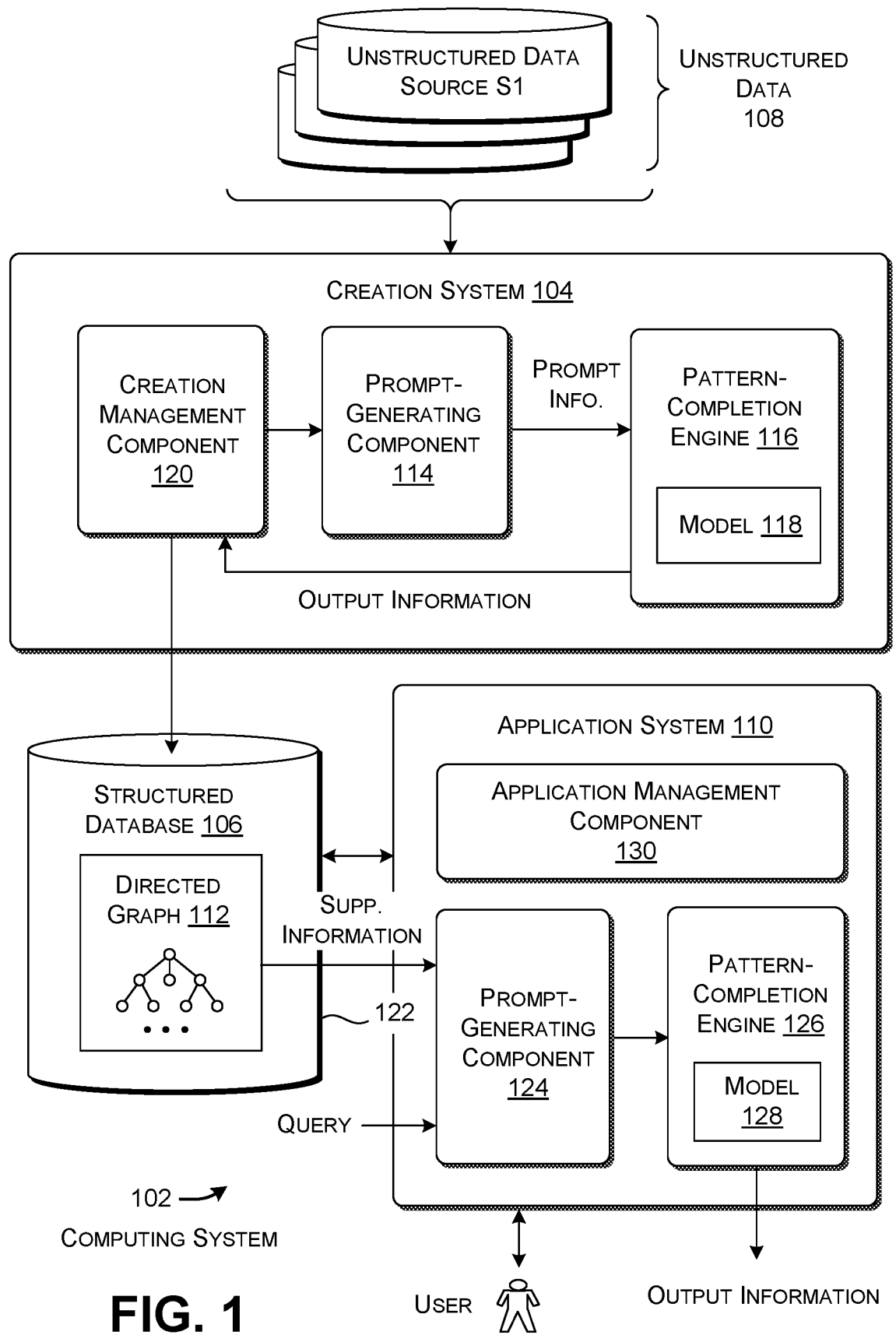
FIG. 1 shows a computing system having a creation system for creating a structured database based on unstructured data, and an application system for interacting with the structured database.

FIG. 1 shows a computing system 102 having a creation system 104 for creating a structured database 106 based on data items extracted from unstructured data 108. An application system 110 interacts with the structured database 106 to perform one or more application tasks.

Figure 15:
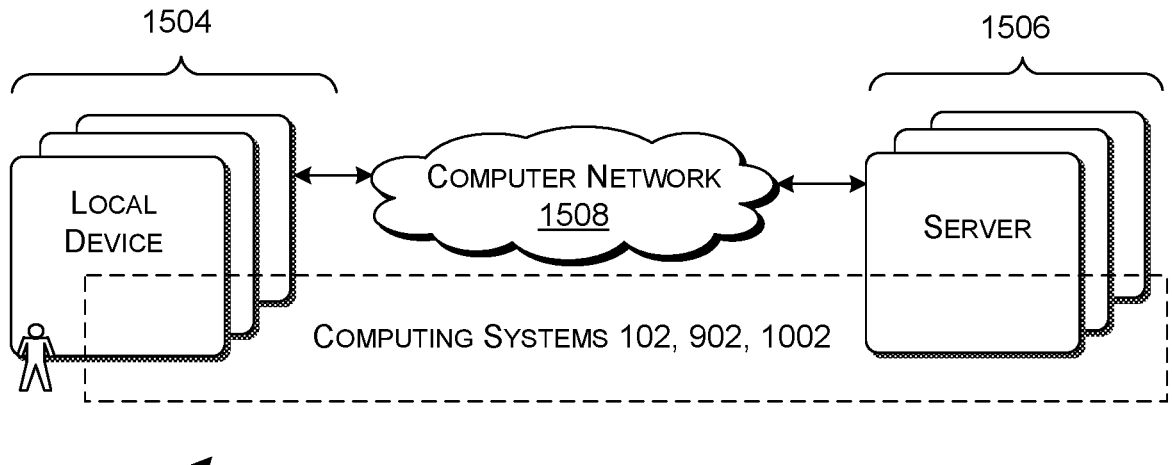
FIG. 15 shows computing equipment that, in some implementations, is used to implement the computing system of FIG. 1.
Figure 16:
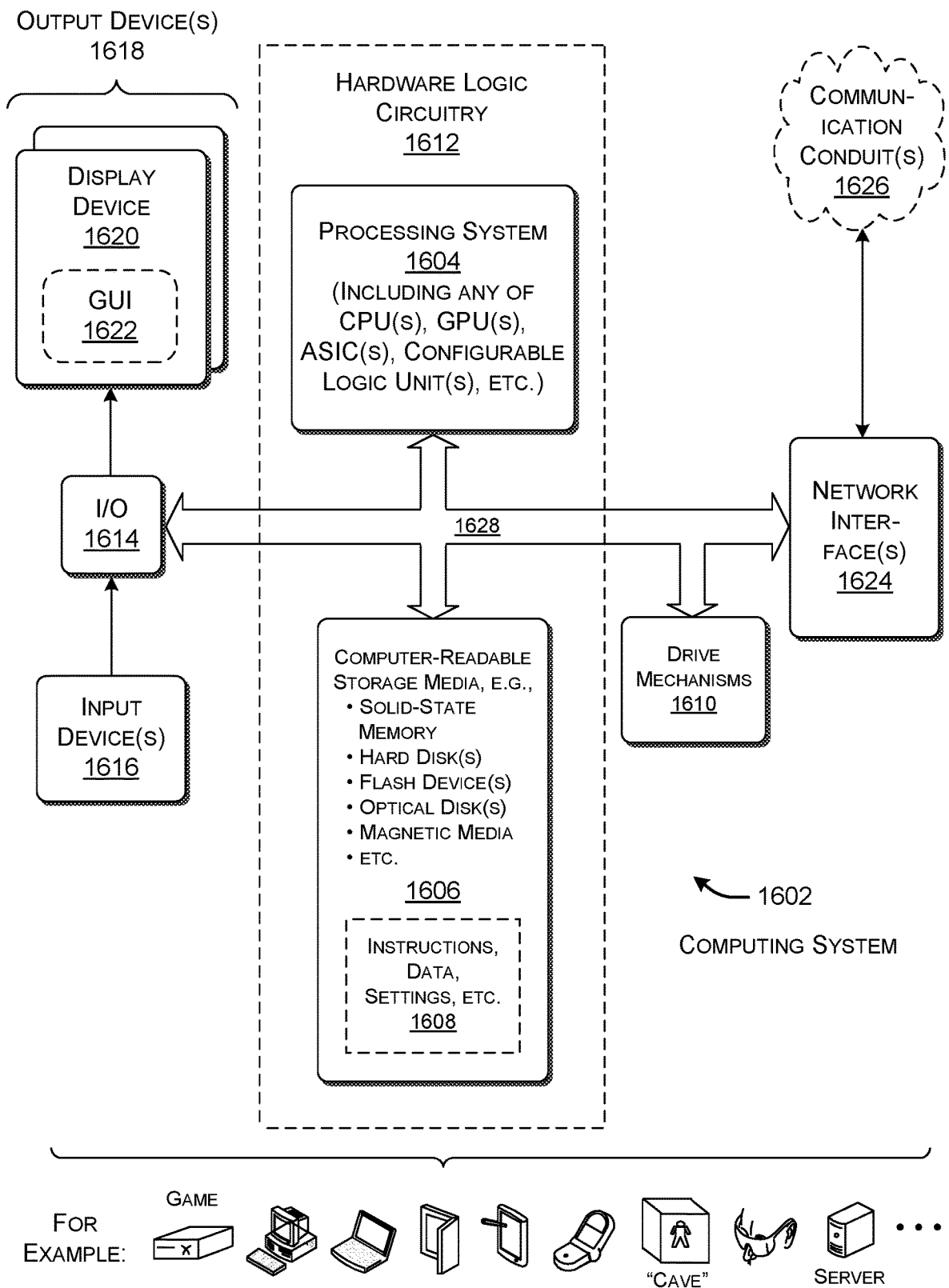
FIG. 16 shows an illustrative type of computing system that, in some implementations, is used to implement any aspect of the features shown in the foregoing drawings.

As to terminology, "unstructured data" refers to data items that do not necessarily conform to any data structure. The structured database 106, by contrast organizes data in a particular way. FIG. 1 specifically shows an example in which the structured database 106 organizes data items using a directed graph 112 of any type. A hierarchical tree is one type of directed graph. A "data item," as the term is used herein, represents any unit of information, including a fragment of a word, a word, or any other alphanumeric string. A "machine-trained model" (or "model" for brevity) refers to computer-implemented logic for executing a task using machine-trained weights that are produced in a training operation. In some contexts, terms such as "component," "module," "engine," and "tool" refer to parts of computer-based technology that perform respective functions. FIGS. 15 and 16, described below, provide examples of illustrative computing equipment for performing these functions.

The unstructured data 108 may originate from one or more data sources, such as a representative data source S1. For instance, the unstructured data 108 represents any combination of: unstructured data scraped from one or web pages; book excerpts; articles; manuals; messages of any type(s); social media posts, etc. Alternatively, or in addition, the unstructured data 108 represents information (e.g., prompt information) specifically created by a user for processing by the computing system 102. No limitation is placed on what may constitute a piece of unstructured data. Further, a piece of unstructured data may be only partially unstructured. In other words, part of a piece of unstructured data may be structured and another part unstructured.

Referring first to the creation system 104, this system involves interaction with a prompt-generating component 114 and a pattern-completion engine 116. The prompt-generating component 114 produces prompt information. In some implementations, the prompt-generating component 114 and the pattern-completion engine 116 correspond to parts of the creation system 104. Alternatively, separate functionality, such as one or more servers, implement the prompt-generating component 114 and/or the pattern-completion engine 116. In the latter case, the creation system 104 interacts with the separate functionality via an application programming interface (API) or some other protocol.

At any given time, the prompt information includes a sequence of text tokens ( . . . $T_{N-3}, T_{N-2}, T_{N-1}, T_N$), with $T_N$ being a last submitted text token. A text token refers to any unit of alphanumeric text, such as a complete word or a fragment of a word. The pattern-completion engine 116 maps the prompt information into output information that identifies a next text token ($T_{N+1}$) that is likely to follow the sequence of text tokens. The prompt-generating component 114 appends the generated token ($T_{N+1}$) to the end of the sequence of tokens, and then feeds the updated prompt information ( . . . $T_{N-3}, T_{N-2}, T_{N-1}, T_N, T_{N+1}$) to the pattern-completion engine 116. The computing system 102 continues this autoregressive process until the pattern-completion engine 116 generates a stop token. The computing system 102 interprets the stop token as an instruction to stop generating tokens in the above-described manner. At the beginning of the auto-regression operation, the prompt-generating component 114 feeds a set of initial tokens to the pattern-completion engine 116. This set of initial tokens is referred to herein as seed prompt information. The seed prompt information is supplied as a given, rather than auto-regressively generated.

In some implementations, the pattern-completion engine 116 is implemented using a machine-trained model 118 that maps a string of input text tokens to a string of output text tokens. The machine-trained model 118 operates based on weights learned by a training system (not shown) in a preceding training process. The training process iteratively adjusts the weights in the course of processing a large corpus of text fragments, with the aim of accurately duplicating the statistical patterns exhibited by those text fragments. For instance, the pattern-completion engine 116 will determine that the token $T_{N+1}$ follows a sequence of previous token ( . . . $T_{N-3}, T_{N-2}, T_{N-1}, T_N$) because, in the preceding training process, it has observed that this pattern is present in many other text fragments.

In some implementations, the machine-trained model 118 is a transformer-based model. Further details regarding this type of model are set forth below in connection with FIG. 11. A publicly available transformer-based model for performing pattern completion is the BLOOM model available from HUGGING FACE, INC., of New York, New York, one version of which is Version 1.3 released on Jul. 6, 2022. Other implementations of the computing system 102 use other types of machine-trained models, including fully-connected feed forward neural networks (FFNs), convolutional neural networks (CNNs), recursive neural networks (RNNs), and so on. In all cases, the machine-trained model 118 performs a generative function, synthesizing output information given an instance of input information. Here, the input information corresponds to selected parts of the unstructured data 108.

Figure 5:
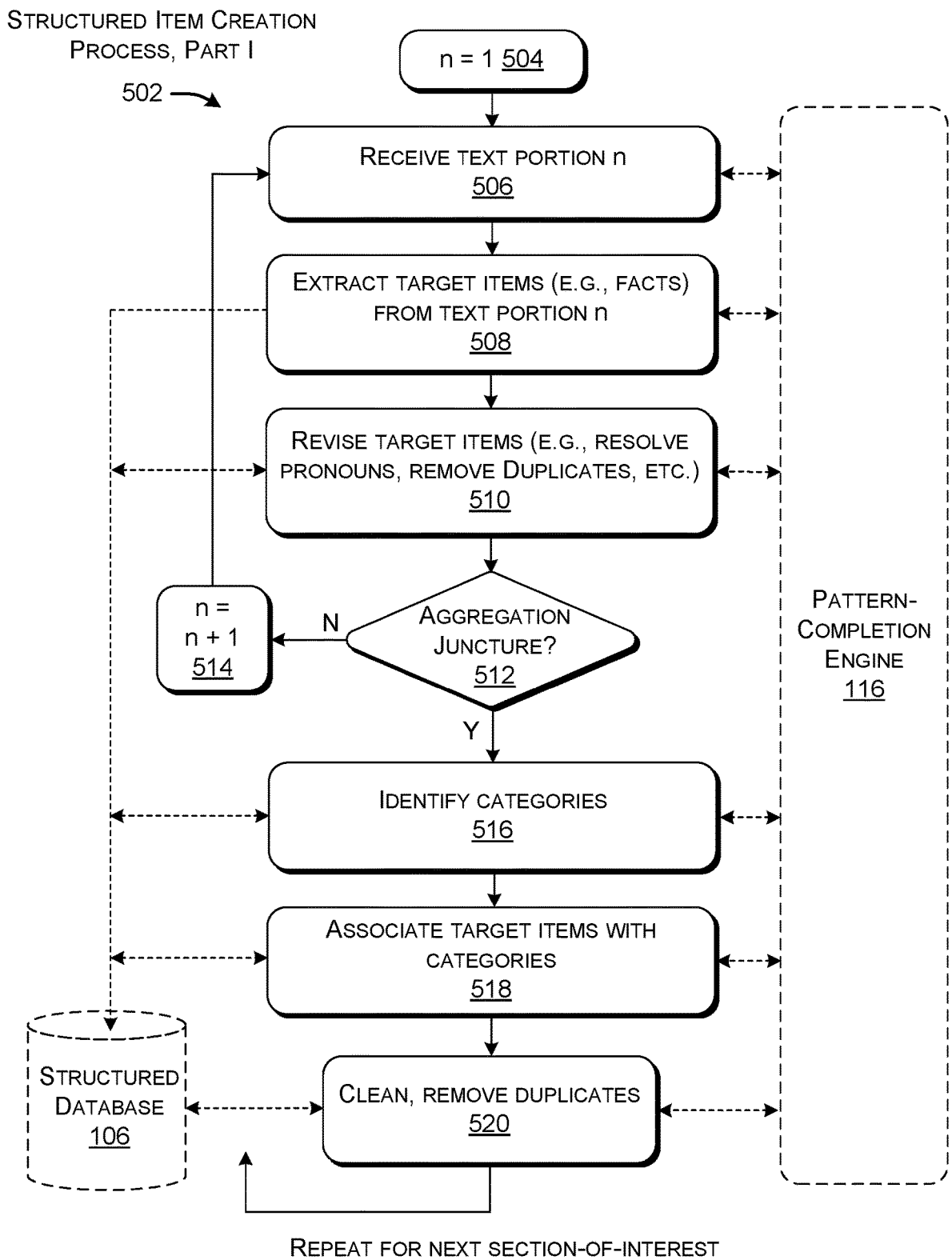
FIG. 5 shows a first part of a process performed by the creation system of FIG. 1.
Figure 6:
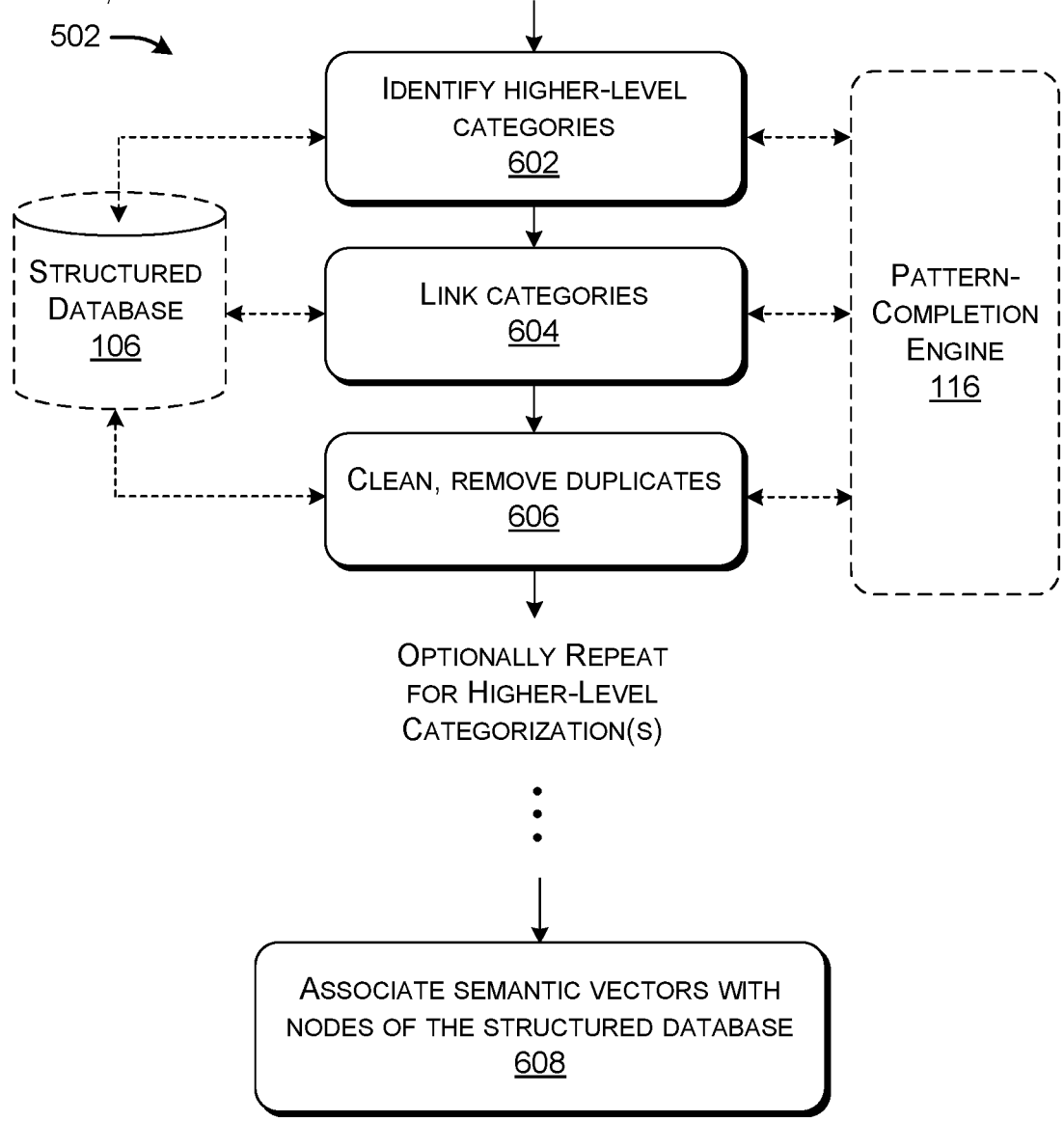
FIG. 6 shows a second part of the process performed by the creation system of FIG. 1.

A creation management component 120 includes logic that directs the prompt-generating component 114 and the pattern-completion engine 116 to successively interrogate the unstructured data 108, with the objective of extracting data items from the unstructured data 108, and organizing those data items into the structured database 106. FIGS. 5 and 6, to be described below, show one method of interrogating the unstructured data 108. The creation management component 120 governs the overall flow of operations shown in those figures.

In some implementations, the creation management component 120 directs the prompt-generating component 114 and the pattern-completion engine 116 to extract a particular type of data item from the structured database 106, or particular types of data items. A data item that is the focus of extraction is referred to herein as an "item-of-interest" or "target item." For example, the creation management component 120 uses the prompt-generating component 114 and the pattern-completion engine 116 to extract statements of fact from the unstructured data 108. Alternatively, or in addition, the creation management component 120 instructs the prompt-generating component 114 and the pattern-completion engine 116 to extract a particular kind (or kinds) of entity name expressed in the unstructured data 108. Alternatively, or in addition, the creation management component 120 controls the prompt-generating component 114 and the pattern-completion engine 116 to extract expressions of opinion from the unstructured data 108. Alternatively, or in addition, the creation management component 120 controls the prompt-generating component 114 and the pattern-completion engine 116 to extract portions of text that match any pattern, e.g., a regular expression. More generally, the computing system 102 is readily configurable to serve different objectives of different respective environments.

In some implementations, the creation management component 120 creates a data structure that expresses items-of-interest (e.g., the facts) as lowest-tier information items, reachable by traversing other parts of the data structure. For instance, assume that the directed graph 112 is organized as a hierarchical tree. The creation management component 120 stores the extracted items-of-interest (e.g., facts) as leaf nodes of the hierarchical tree that are reachable by traversing the tree starting from its root node.

As a next focus of interrogation, the creation management component 120 directs the prompt-generating component 114 and the pattern-completion engine 116 to determine categories associated with the items-of-interest, and to determine the connections between the categories and particular items-of-interest. This set of categories may be considered child categories. As a next focus of interrogation, the creation management component 120 directs the prompt-generating component 114 and the pattern-completion engine 116 to determine parent categories that present higher-level abstractions of the child categories. The creation management component 120 also directs the prompt-generating component 114 and pattern-completion engine 116 to determine the connections between the parent categories and individual child categories. The creation management component 120 may execute the same process for additional levels of abstraction.

In summary, the creation management component 120 directs the prompt-generating component 114 and the pattern-completion engine 116 to build the structured database from "ground up," beginning with the extraction of items-of-interest, and terminating with the identification of one or more ancestor nodes associated with respective abstract concepts. Other implementations of the computing system 102 use other structuring paradigms to govern the creation process. For instance, the creation management component 120 can create any type of link found in a directed graph, not limited to links for moving up and down a hierarchical tree.

Figure 9:
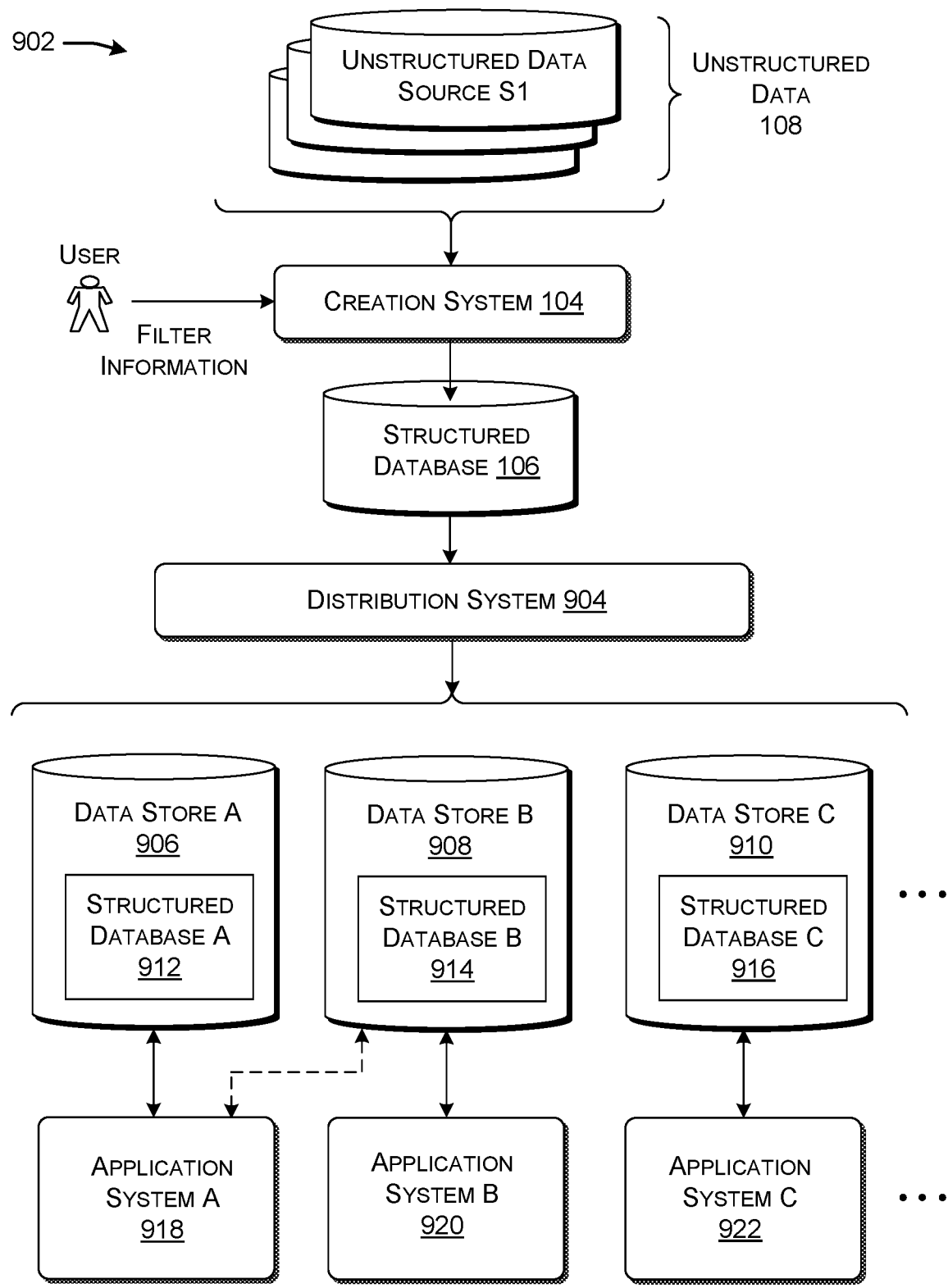
FIG. 9 shows a computing system that uses the creation system of FIG. 1 to selectively make particular items-of-interest available to particular recipients.

The structured database 106 is stored in a data store 122. In some cases, the data store 122 represents a single physical storage provided at a single location, to which different users may have different access rights. In other cases, the data store 122 represents plural physical stores located at the same location or distributed over plural locations. FIG. 9, to be described in turn, shows an example in which the structured database 106 is partitioned into plural structured databases at different respective locations, where they serve as local caches for users at those locations.

Different application systems can make use the structured database 106, to serve different application objectives. FIG. 1 shows a single representative application system 110. Like the creation system 104, the application system 110 makes use of a prompt-generating component 124 and a pattern-completion engine 126. The pattern-completion engine 126 relies on a machine-trained model 128. The prompt-generating component 124 and the pattern-completion engine 126 perform the same functions as the counterpart components of the same name in the creation system 104. Indeed, the prompt-generating component 124 and the pattern-completion engine 126 may represent the same components as the prompt-generating component 114 and the pattern-completion engine 116 of the creation system 104, although they need not be.

In some implementations, the functionality of the application system 110 incorporates the prompt-generating component 124 and the pattern-creation engine 126 as parts thereof. In other implementations, other computing functionality implements the prompt-generating component 124 and/or the pattern-completion engine 126. In this case, the application management component 130 interacts with these components via an API or some other protocol.

An application management component 130 coordinates the operations performed by the application system 110. For example, in some implementations, the application management component 130, upon receipt of a query, directs the prompt-generating component 124 and the pattern-completion engine 126 to perform a two-phase inquiry. In a first phase, the application management component 130 extracts supplemental information from the structured database 106, as guided by the contents of the query. In a second phase, the application management component 130 leverages the prompt-generating component 124 and the pattern-completion engine 126 to answer the query based on: (a) the text in the original query; and (b) the supplemental information that has been extracted from the structured database 106.

In some implementations, the application management component 130 repeats the above-described two-phase operation one or more times until it extracts facts that relevant to the query. For example, in a first pass, the application management component 130 determines whether any category at a particular level of a hierarchical tree is relevant to the topic(s) expressed by the query. The application management component 130 repeats this operation for successively more detailed sets of categories at successively lower levels of the hierarchical tree. In a final pass, the application management component 130 asks whether one or more items-of-interest (e.g., facts) provided at the leaf-node layer of the hierarchical tree are relevant to the topic(s) of the query. In summary, in this approach, the application management component 130 advances from the top of the tree to its bottom, presenting questions to the pattern-completion engine 126 that are relevant to one path through the hierarchical tree.

More broadly stated, the application system 110 leverages the structured database 106 to help understand the query. By virtue of this manner of operation, the application system 110 is able to effectively interpret topics that are not well represented by the training data that was used to produce the machine-trained model 128. As a second benefit, the application system 110 uses the information in the structured database 106 as a metaphorical guardrail to help constrain the generative function performed by the pattern-completion engine 126. Through this restraint, the application system 110 reduces the risk that the pattern-completion engine 126 will generate undesired output information, such as non-factual output information, nonsensical output information, and/or output information that is otherwise considered unacceptable for any reason, with respect to the norms and mores of a particular community.

Figures 2, 3:
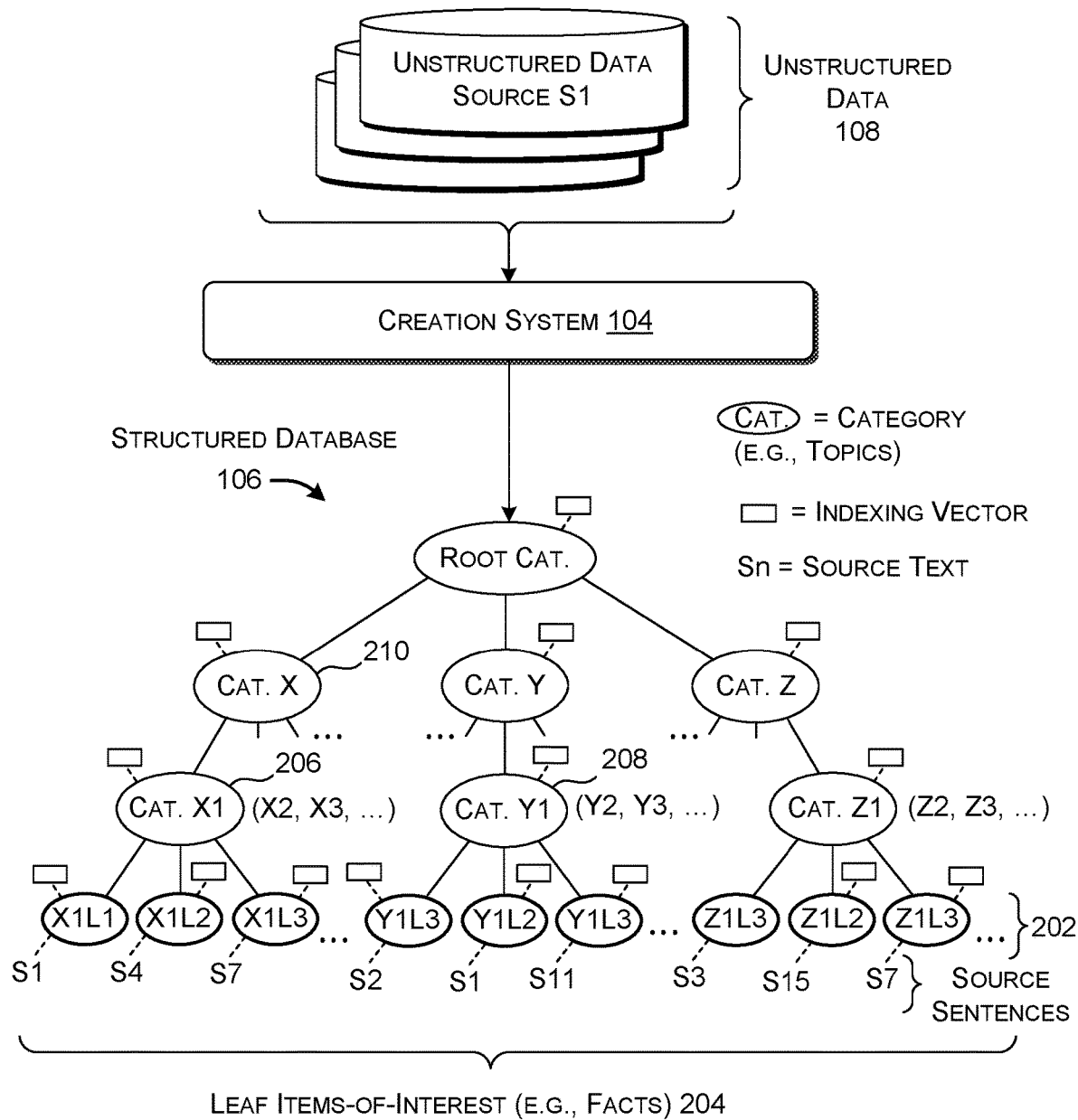
FIG. 2 shows a simplified representation of a structured database produced by the creation system of FIG. 1.
FIG. 3 shows examples of different ways of categorizing items-of-interest.

FIG. 2 shows one implementation of the structured database 106 produced by the creation system 104 based on the unstructured data 108. In this example, the structured database 106 forms a hierarchical tree of nodes connected by edges. Each edge between two nodes represents a relationship between the two nodes. The leaf nodes 202 represents the lowest-level items-of-interest 204 extracted from the unstructured data 108. For example, the items-of-interest 204 correspond to respective expressions of facts ("facts" for brevity). Higher-level nodes represent respective subject matter categories. For instance, a node 206 represents a category X1. The child nodes linked to this category X1 represent facts X1L1, X1L2, and X1L3. These designators are labels. For example, assume that the category X1 represents a particular disease, and the facts X1L1, X1L2, and X1L3 represent factual statements regarding this particular disease. The node 208, associated with category Y1, represents another disease. Higher-level nodes represent categories on a higher level of abstraction than individual diseases. For example, assume that node 210, associated with master category X, represents kidney-related diseases. Generally, the example of the structured database 106 shown in FIG. 2 may represent a much-simplified version of a more complex data structure having any number of layers.

In some implementations, the creation system 104 further connects each item-of-interest to the portion (or portions) of the unstructured data 108 from which it originated. For example, assume that the creation system 104 extracted a fact from a particular sentence. The creation system 104 links the node expressing that fact to an identifier of the sentence in the unstructured data 108 from which the fact originated. A fact may link to two or more sentences which express the fact. Further, a single sentence may be the source of two or more facts.

Note that FIG. 2 illustrates the non-limiting case in which each item-of-interest (e.g., each fact) is associated with a single category. In other examples, any given item-of-interest can be associated with two or more categories. Further any child category can be associated with two or more parent categories. Other structured databases include bidirectional links, links between items-of-interest, links that point from child nodes to parent nodes, and so on. In other words, other structured databases include any type(s) of edges used in directed graphs, establishing connections among nodes that are not necessarily top-down hierarchical in nature.

In addition, or alternatively, the creation system 104 associates semantic index information with each node. Assume that a particular node represents a piece of text X, such as a name of a category or a fact. The creation system 104 creates semantic index information for this node by using a neural network of any type to map the text X to a distributed vector $V_X$ in a vector space. A matching engine (not shown) assesses the similarity between two concepts by measuring their distance in the vector space, e.g., using a cosine similarity metric or any other measure of distance.

A distributed vector is a vector that expresses information using values distributed over its plural dimensions. A distributed vector contrasts with a one-hot vector that allocates different concepts to specific dimensions of the vector. A one-hot vector is sparse, whereas a distributed vector is typically not sparse. A one-hot vector is considered sparse because it includes as many dimensions as the size of a vocabulary; to express a particular concept, only the entries in the one-hot vector associated with the concept will have non-zero values.

As summarized by FIG. 3, the structured database 106 generally includes category-related nodes that represent any characteristics of the items-of-interest, not limited to subject matter-related categories. For example, in other implementations, the structured database 106 includes category nodes that expresses different privileges associated with the items-of-interest. Alternatively, or in addition, the structured database 106 includes category nodes that express different levels of age-appropriateness of items-of-interest, and so on. The structured database 106 can link a single item-of-interest to any number of these categories. For instance, the structured database 106 can include an edge that links a fact to a subject-matter category and a privilege-related category (defining the type of user that is entitled to consume the fact). The application system 110 can likewise explore any dimension(s) of the structured database in performing its retrieval function.

Alternatively, or in addition, the structured database 106 expresses properties of an item-of-interest by attaching metadata to the item-of-interest. For example, assume that an item-of-interest expresses a fact about a historical event. The structured database 106 attaches a first property that identifies the type of source from which this fact originated. A second property provides a score that identifies the reliability (confidence) of this fact. A third property provides an indication of the age-appropriateness of this fact. A fourth property expresses privileges associated with this fact, and so on. The application system 110 can formulate a query that seeks information with respect to any property (or properties) expressed by the structured database 106.

According to illustrative merits, the creation system 104 facilitates the task of creating structured records from the unstructured data 108. That is, the creation system 104 performs a technique that: (a) requires less time and consumes fewer computing resources compared to manual curation techniques; (b) provides more consistent results compared to manual curation techniques; and (c) scales more effectively than other automated solutions. As to advantage (c), an administrator configures the creation system 104 to extract target items in a particular environment by redefining the prompt information that is fed to the pattern-completion engine 116, and/or the sequencing at which different instances of prompt information are fed to the pattern-completion engine 116. This change does not require retraining the pattern-completion engine 116 itself, or new techniques for scraping information from unstructured records.

Figure 4:
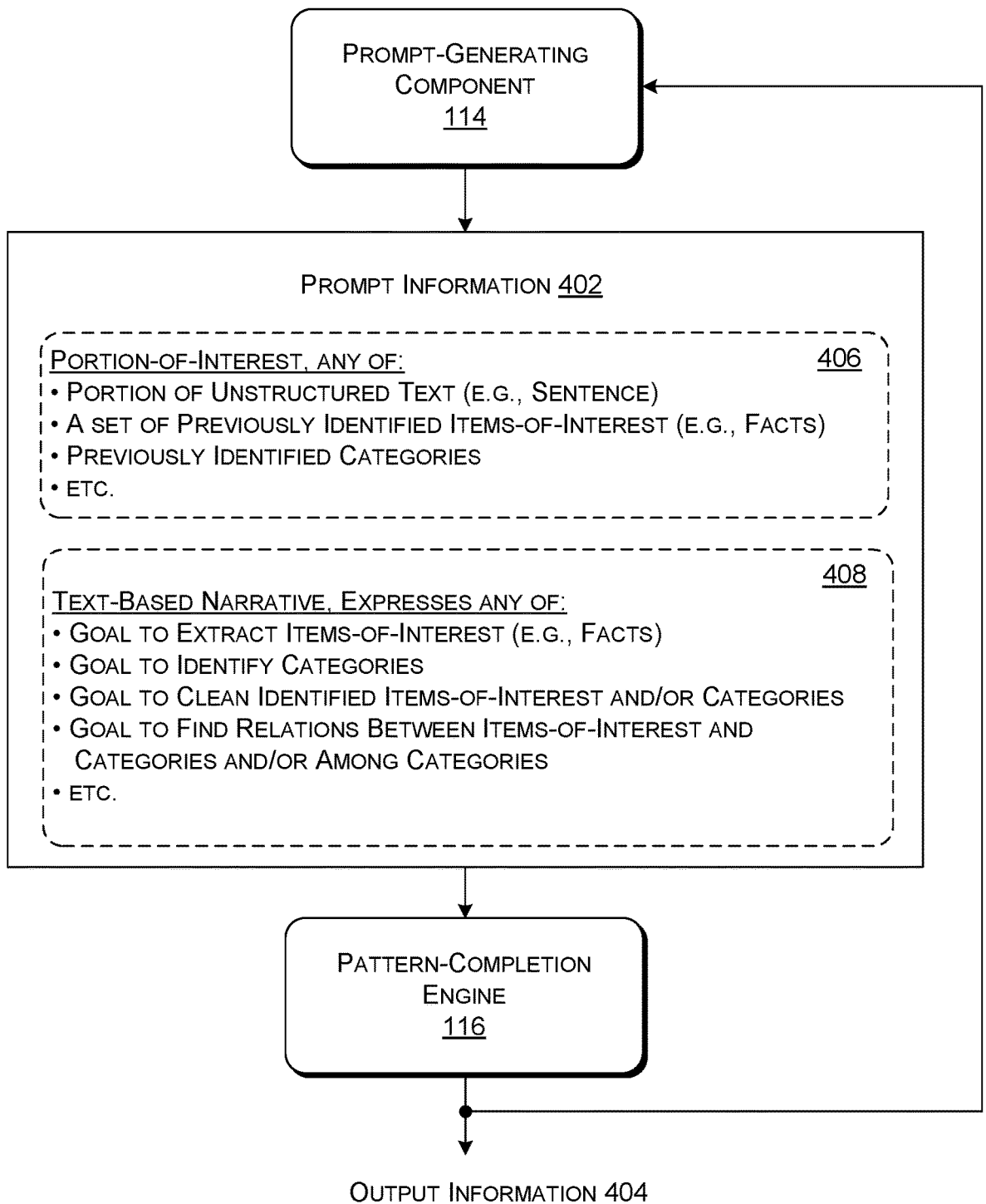
FIG. 4 summarizes one manner by which the creation system of FIG. 1 interacts with a machine-trained pattern-completion engine.

FIG. 4 summarizes one manner by which the creation system 104 of FIG. 1 interacts with the pattern-completion engine 116. Generally stated, the prompt-generating component 114 produces prompt information 402. The pattern-completion engine 116 maps the prompt information 402 to output information 404. The creation management component 120 appends the output information 404 to the prompt information 402, to create updated prompt information. The pattern-completion engine 116 then maps the updated prompt information to the updated output information. This auto-regressive operation continues until the pattern-completion engine 116 generates a stop token. The prompt-generating component 114 flushes its token buffer whenever it begins a new phase of its inquiry, as governed by environment-specific considerations.

Generally stated, in the creation phase, any instance of prompt information 402 identifies a portion-of-interest 406 and a text-based narrative 408. A portion-of-interest defines the scope of content that is to be examined in the unstructured data 108. A text-based narrative informs the pattern-completion engine 116 what analysis it is expected to perform with respect to the portion of interest. Recall that the pattern-completion engine 116 has been trained to follow a statistical pattern it has encountered many times in its training data. Thus, a text-based narrative is constructed to "set up" the pattern-completion engine 116 with a first part of a statistical pattern, with the expectation that the pattern-completion engine 116 will complete this pattern in an expected manner. Thus, a text-based narrative may have the effect of giving the pattern-completion engine 116 an "instruction," but it is not an instruction in the traditional sense of a programmatic instruction. In some formulations, the text-based narrative expresses the result of whatever end-objective is being sought, and how it is to be obtained.

In different respective passes, the prompt-generating component 114 expresses a different portion-of-interest and a corresponding different text-based narrative. In one pass, for instance, the prompt-generating component 114 creates a portion-of-interest that specifies a specific portion of the unstructured data 108, such as a sentence. The text-based narrative guides the pattern-completion engine 116 to extract all the items-of-interest (e.g., facts) expressed in this portion-of-interest.

In another pass, the prompt-generating component 114 creates a portion-of-interest that specifies a set of previously-extracted items-of-interest (e.g., facts). The text-based narrative guides the pattern-completion engine 116 to identify all the categories associated with the items-of-interest.

In another pass, the prompt-generating component 114 creates a portion-of-interest that specifies a set of previously-extracted items-of-interest (e.g., facts) and previously-identified categories. The text-based narrative guides the pattern-completion engine 116 to identify the relations (e.g., links) between the items-of-interest and the categories.

In another pass, the prompt-generating component 114 creates a portion-of-interest that specifies a set of previously-extracted categories. Assume that these categories constitute child categories. The text-based narrative guides the pattern-completion engine 116 to identify parent categories associated with the child categories.

In another pass, the prompt-generating component 114 creates a portion-of-interest that specifies a set of previously-extracted child categories and parent categories. The text-based narrative guides the pattern-completion engine 116 to identify the relations (e.g., links) between the child categories and the parent categories.

In another pass, the prompt-generating component 114 creates a portion-of-interest that specifies a set of previously-extracted items-of-interest, or child categories, parent-categories, or some other information items. The text-based narrative guides the pattern-completion engine 116 to perform some cleaning operation on this set, such as resolving the identity of pronouns in a set of items of interest (e.g., by replacing "there" with "Seattle," or replacing "him" with "Bill Gates"), or by removing duplicate entries from the set.

The extraction operations described above are illustrative. Other implementations perform one or more other extraction operations, not mentioned above. Alternatively, or in addition, other implementations omit one or more of the extraction operations set forth above. Further, the creation system 104 can be tasked with the responsibility of performing two or more of the extractions summarized above in a single pass, such as by resolving pronouns and removing duplicate items-of-interest in a single pass.

The application system 110 governs the prompt-generating component 124 and the pattern-completion engine 126 to execute a retrieval operation. Here, in some passes, the prompt-generating component 124 formulates prompt information that expresses: (a) supplemental information extracted from the structured database 106; (b) a query submitted by the user (or portion thereof); and (c) a text-based narrative that identifies the task that is being given to the pattern-completion engine 126. In many cases, the task is to determine whether the supplemental information is relevant to the query.

FIG. 5 shows a first part of a process 502 performed by the creation system 104 of FIG. 1. The following general information applies to all processes described in this Detailed Description, including the process 502. The process 502 is expressed as a series of operations performed in a particular order. But the order of these operations is merely representative, and the operations are capable of being varied in other implementations. Further, any two or more operations described below can be performed in a parallel manner. In one implementation, the blocks shown in the process 502 that pertain to processing-related functions are implemented by the hardware logic circuitry described in connection with FIGS. 15 and 16, which, in turn, is implemented by one or more processors, a computer-readable storage medium, etc.

In block 504, the creation management component 120 sets a counter n to 1. In block 506, the creation management component 120 receives a first text portion of a first section-of-interest in the unstructured data 108. For example, the first text portion may correspond to a first sentence in a first paragraph of the unstructured data 108. In block 508, the creation management component 120 guides the prompt-generating component 114 and the pattern-completion engine 116 to extract all items-of-interest (e.g., facts) from the first text portion. For brevity, FIG. 5 refers to the items-of-interest as "target items," meaning that that they are the targets of extraction, or the targets of interest. To perform this task, the prompt-generating component 114 formulates prompt information that expresses the first sentence, and a text-based narrative that expresses the goal of extracting items-of-interest from the first sentence. For example, the prompt-generating component 114 may generate the text: "Please list all the facts that are present in the following sentence. If there are no facts, respond 'None'. The sentence is as follows: <Sentence>." The prompt-generating component 114 replaces the variable <Sentence> with the first sentence. The pattern-completion engine 116 responds to this prompt information by generating output information that expresses the items-of-interest in the first sentence, or the response "None" (or the like), which indicates that no items-of-interest were found.

FIG. 5 shows that plural operations of the process 502, including the operation of block 508, interact with the structured database 106 being constructed. This means that the operations of the process 502 add information to the structured database 106 and/or extract information from the structured database 106 that was previously determined in a previous operation. Other implementations can use one or more temporary working memories to accomplish the same result.

In block 510, the creation management component 120 guides the prompt-generating component 114 and the pattern-completion engine 116 to revise the collected items of interest in one or more passes. For example, in a first pass, the creation management component 120 guides the prompt-generating component 114 and the pattern-completion engine 116 to remove duplicates from the items-of-interest. In a second pass, the creation management component 120 guides the prompt-generating component 114 and the pattern-completion engine 116 to replace pronouns with entity names, and so on. Suitable prompt information for guiding the latter task is: "Define all of the pronouns in the facts: <facts>." In each pass, the pattern-completion engine 126 produces output information that identifies appropriate revisions, e.g., by specifying items-of-interest to be removed, and/or identifying revised items-of-interest in which the pronouns have been replaced with proper entity names. In other implementations, the creation management component 120 performs the operation(s) of block 510 at another juncture of the process flow, such as between blocks 514 and 506, and/or between blocks 512 and 516 (described below).

In block 512, the creation management component 120 determines whether an aggregation juncture has been reached, as when the creation system 104 completes its analysis of the last sentence of the first paragraph. If the juncture has not yet been reached, in block 514, the counter n is incremented by one, and the above-described extraction process is repeated for the second portion-of-interest (e.g., the second sentence) of the section-of-interest. Here, the section-of-interest is the first paragraph.

Assume that the test of block 512 is answered in the affirmative (Y), indicating that the end of the current sectionof-interest has been reached. In block 516, the creation management component 120 directs the prompt-generating component 114 and the pattern-completion engine 116 to identify the categories associated with the first section-of-interest. Suitable prompt information for performing this task is: "What are some higher-level categories that subsets of the facts <facts> could be grouped into?" The pattern-completion engine 116 generates output information that identifies the categories.

In block 518, the creation management component 120 directs the prompt-generating component 114 and the pattern-completion engine 116 to identify links between the items-of-interest and the categories identified in block 516. In block 520, the creation management component 120 directs the prompt-generating component 114 and the pattern-completion engine 116 to clean up the categories, e.g., by removing duplicate categories. The creation management component 120 then repeats the above-described operations for the next section-of-interest, such as the next paragraph.

FIG. 6 shows a second part of the process 502 performed by the creation management component 120. In one implementation, the creation management component 120 performs the second part of the process upon reaching the end of a higher-level section-of-interest, such as a page, or a chapter, etc.

In block 602, the creation management component 120 directs the prompt-generating component 114 and the pattern-completion engine 116 to identify higher-level categories associated with a specified set of child categories. In response, the pattern-completion engine 116 generates output information that identifies a set of parent categories.

In block 604, the creation management component 120 directs the prompt-generating component 114 and the pattern-completion engine 116 to establish links between parent categories and child categories, or, more generally, to establish relations between categories (not limited to parent-to-child relationships). In response, the pattern-completion engine 116 generates output information that identifies the relations among the categories.

In block 606, creation management component 120 directs the prompt-generating component 114 and the pattern-completion engine 116 to clean up the above-described categories and links, e.g., by removing duplicate categories. In response, the pattern-completion engine 116 generates output information that describes the revised data structure, e.g., by identifying the categories to be removed.

FIG. 6 indicates that the creation management component 120 can repeat the above-described process for other higher-level sections-of-interest in the unstructured data 108. Note that other implementations may perform any of the operations described above in a different order than set forth above, and/or in a parallel manner. Alternatively, or in addition, other implementations may omit one or more of the operations described above, and/or introduce one or more additional operations not described above.

In block 608, the creation management component 120 interacts with a neural network of any type to translate text associated with each node in the structured database 106 to semantic index information, such as a distributed vector. In addition, or alternatively, the creation management component 120 adds links between the items-of-interest (e.g., the facts) and the portions-of-interest (e.g., the sentences) in the unstructured data 108 from which they originated.

Note that the structured database 106 will include text-based facts and categories. By virtue of this form, a user can readily understand the contents and organization of the structured database 106, and also manually edit the structured database 106. For example, the user may identify a faulty statement of fact in the structured database 106. The user can respond to this finding by deleting or modifying the fact. By correcting the structured database 106 in this manner, the user reduces the risk that the application system 110 will draw incorrect conclusions from the same structured database 106.

As one variation of the above process 502, assume that the creation management component 120 cannot identify items-of-interest or categories with sufficient confidence. The creation management component 120 responds to this situation by inviting the user to create prompt information that provides clues as to how to interpret the items-of-interest or categories.

In another variation, again assume that the creation management component 120 cannot identify items-of-interest with sufficient confidence. For example, assume that an administrator instructs the creation system 104 to extract all project names mentioned in a corpus of a company's Email messages. In some implementations, the creation management component 120 executes a first stage to extracts names that have a prescribed probability of being project names. These constitute candidate names. In a second stage, the creation management component 120 attempts to confirm whether each of the candidate names is a project name. For example, assume that, in the first phase, the creation management component 120 uses the pattern-completion engine 126 to determine that a name "ABC" is a potential project name. Assume that most of the Email messages that mention this name are written or received by members of a particular division of the company. In the second phase, the creation management component 120 uses the pattern-completion engine 126 to examine a more comprehensive collection of the documents associated with the division in question, to confirm or refute the preliminary conclusion that "ABC" is a project name.

As another variation, a user can guide the pattern-completion engine 126 in the manner it chooses facts and categories (rather than, as assumed above, giving the pattern-completion engine 126 free reign to create the database in the manner it deems appropriate, based on the statistical patterns it embodies via its weights). For instance, assume that a user has advance knowledge that a set of relevant categories are appropriate within a particular environment. The user can create prompt information that asks the pattern-completion engine 126 to choose from the set of permissible categories when performing its otherwise automatic category analysis. Different environments can vary this type of guidance in different ways, including any of: a) specifying permissible categories on a level-by-level basis; b) specifying impermissible categories; c) specifying characteristics/conditions of permissible and/or impermissible facts; d) specifying link constraints, level-related constraints, size-related constraints, and so on.

As another variation, the creation system 104 can direct the pattern-completion engine 126 to revise a structured database it has created, or a preexisting structured database created through some other process (including a manual process). For instance, the creation system 104 can guide the pattern-completion engine 126 to add, remove and/or modify facts and/or categories from the preexisting database.

Generally, the creation management component 120 is governed by an application-specific algorithm that specifies the sequence of interrogation operations that it performs.

The algorithm optionally includes conditional logic that invokes certain operations when specified conditions are detected.

Figure 7:
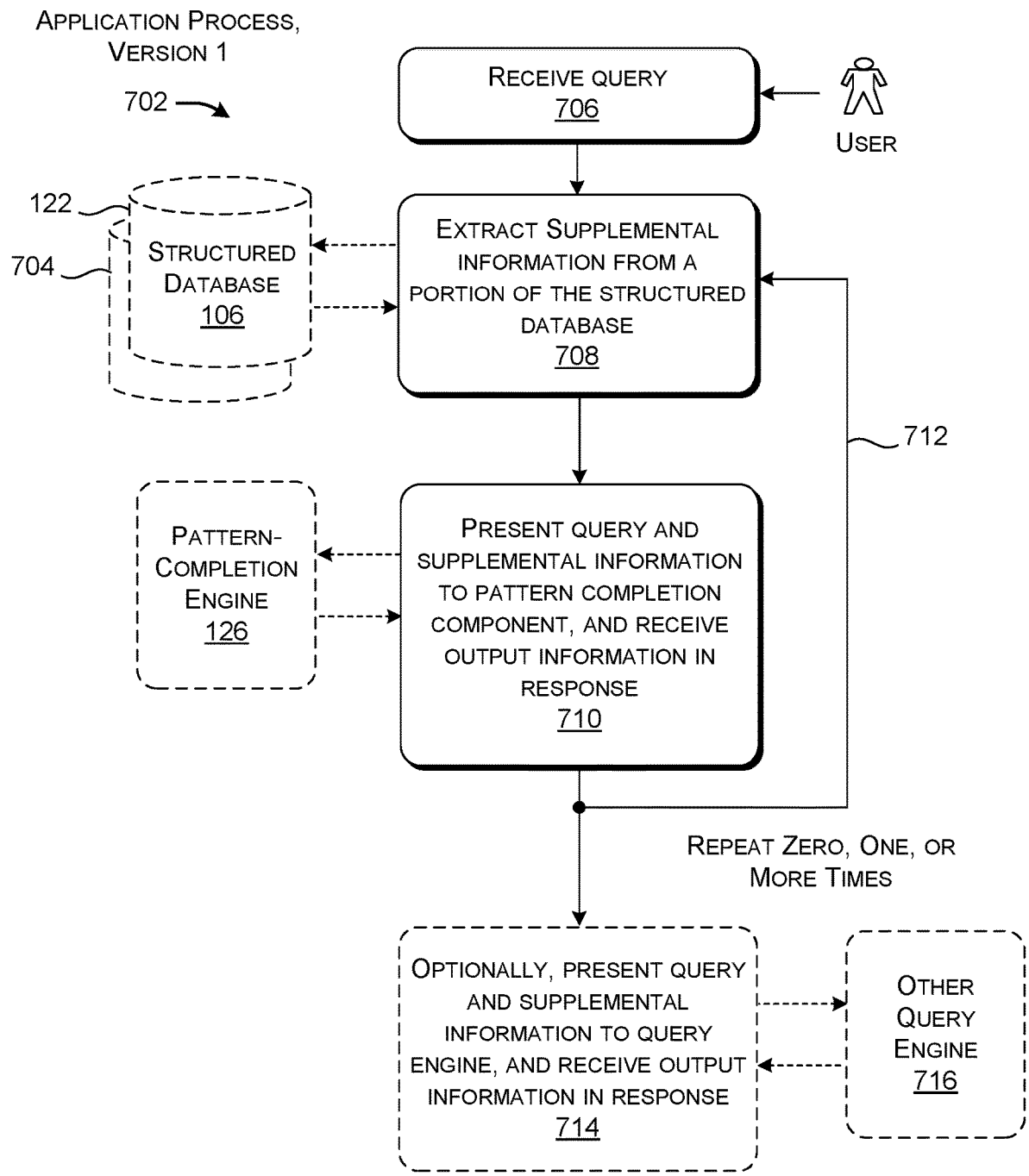
FIG. 7 shows a process performed by the application system of FIG. 1.

FIG. 7 shows a process 702 performed by one type of application management component 130 of the application system 110 of FIG. 1. Assume that the application management component 130 interacts with the structured database 106 produced by the creation system 104. Alternatively, or in addition, the application management component 130 interacts with one or more other databases 704, including any database that is produced by a technique other than that described in the process 502 of FIGS. 5 and 6. In other words, the application system 110 improves a traditional search experience with or without the functionality provided by the creation system 104.

In block 706, the application management component 130 receives a query, e.g., submitted by a user using a text input device, voice recognition input device, etc. Alternatively, or in addition, the query may reflect a portion of information with which the user is currently interacting, such as a portion of a web page with which the user is currently interacting.

The process 702 has two phases, represented by blocks 708 and 710. In block 708, the application management component 130 extracts supplemental information from the structured database 106. In some implementations, the application management component 130 performs this task by extracting information at a specified level of the structured database 106. For example, the application management component 130 can extract all category names associated with a specific level of a knowledge graph constructed as a hierarchical tree.

In block 710, the application management component 130 instructs the prompt-generating component 124 to formulate an instance of prompt information to be presented to the pattern-completion engine 126. In some examples, the prompt information specifies the information that has been extracted from the structured database 106 in block 708, e.g., by specifying the set of category names at a specific level of the structured database 106. This is an example of supplemental information. The prompt information also includes a text-based narrative that specifies how the pattern-completion engine 126 is expected to respond to the extracted information. For example, assume that the user's query (Query_input) is: "What kind of dog is best to get if I live in a small apartment?" Further assume that the identified categories (Cat_extracted) at a particular level of the structured database 106 are "cats," "fish," "dogs," "rabbits," and "birds," generally corresponding to kinds of animals that people keep as pets. Assume that the prompt-generation component 124 generates prompt information of the following form: "Identify which of the categories <Cat_extracted> are relevant to the query <Query_input>, where the variable <Cat_extracted> specifies the categories that have been extracted from a specified level of the structured database 106 (in block 708) and the variable <Query_input> includes the text of the query or a portion thereof. In response, the pattern-completion engine 126 generates output information that serves as an answer to the prompt information, e.g., by outputting the text: "The category 'Dogs' is relevant to a question about selecting a kind of dog."

The application management component 130 repeats the above-described two-step process one more times, as indicated by loop 712. In each pass, the application management component 130 first extracts a particular part of the structured database 106 (in block 708), and, then the application management component 130 directs the prompt-generating component 124 and the pattern-completion engine 126 to answer a question composed on the basis of the information extracted in block 708 and the query (in block 710).

In some examples, the application management component 130 progressively moves down the levels of the structured database 106, e.g., from a root node to a leaf node (or leaf nodes). At each pass, the application management component 130 seeks to extract more detailed information from the structured database. For example, assume that a parent category "dogs" in the structured database has the child categories of "selecting a dog," "training your dog," and "caring for your dog." This is another example of supplemental information. With appropriately formulated prompt information, assume that the pattern-completion engine 126 generates output information that specifies that: "The category of 'selecting a dog' is the most relevant to the query, and the category 'training a dog' is the second most relevant to the query." Assume that a category in a lowest tier of category includes a fact that specifies that "The Maltese breed is small in size, and seldom barks." Another fact specifies that "The most popular breed for people living in apartments in NYC is the French Bulldog." This is another example of supplemental information. With appropriately formulated prompt information, assume that the prompt-completion engine 126 indicates at least these two facts are relevant to the user's query.

Other implementations of the application management component 130 interrogate the structured database 106 in other ways, not limited to the kind of top-down exploration described above. For example, assume that the application management component 130 extracts a fact having a low confidence associated with it. (The application management component 130 may assess the confidence of a fact by using the type of vector comparison operation described below, and then comparing the outcome of this vector comparison operation with an environment-specific threshold value.) In some implementation, the application management component 130 addresses this outcome by exploring another path through the structured database, e.g., associated with a second-best category identified at a previous step in the process 502. The goal of this behavior is to find a fact having a higher confidence level than the previously-identified fact. In addition, or alternatively, the application management component 130 can use the structured database 106 to make one or more follow-up queries, aimed at verifying the appropriateness of a fact. Generally, the application management component 130 is governed by an application-specific algorithm that specifies the sequence of interrogation operations that it performs. The algorithm optionally includes conditional logic that invokes certain operations when specified conditions are detected.

In some implementations, the application management component 130 treats the output information generated by the pattern-completion engine 126 as the final output of a query session. That is, the session ends when the pattern-completion engine 126 informs the user of the breeds of dog that are suitable for a person living in an apartment. Alternatively, or in addition, in block 714, the application system presents the query and the supplemental information extracted from the structured database 106 to any type of query engine 716, such as the BING engine provided by MICROSOFT CORPORATION of Redmond, Washington. The query engine 716 generates query output information based on its engine-specific algorithms. In some cases, the engine-specific algorithms include lexical-based searching algorithms, semantic-based searching algorithms, and so on.

In another implementation (not shown in FIG. 7), the application management component 130 uses any type of neural network to convert the query to a query vector $V_Q$. Assume that the creation system 104 has previously converted each category to its own vector $V_C$, and each fact to its own vector VF. The application management component 130 then searches the structured database 106 to identify the category vector(s) and fact vector(s) that are closest to the query vector in vector space. In some implementations, the application management component 130 computes the distance between two vectors using the cosine similarity metric.

In some implementations of the above technique, the application management component 130 explores the structured database 106 in a top down manner. For instance, the application management component 130 finds the top-level category that is most relevant to the query. Assume that this top-level category has a set of child categories. The application management component 130 then finds the child category that is the most semantically similar to the query. The application management component 130 repeats this process until it advances to the leaf nodes of the structured database 106. It then chooses one or more facts that are the most semantically similar to the query. The application management component 130 makes all of these assessments by comparing the query vector to a target vector in the structured database, corresponding to either a category vector or a fact vector.

In another case, assume that the application management component 130 discovers that no category at a particular level is sufficiently similar to the query. In some implementations, the application management component 130 addresses this issue by advancing directly to the leaf nodes of the structured database. It then compares the query vector with each fact vector, and selects the fact(s) that are the most semantically similar to the query. If no fact is within a prescribed distance to the query (in vector space), then the application management component 130 indicates that no fact in the structured database 106 is relevant to the query.

The application management component 130 also executes the above-described vector comparison operation when certain conditions are encountered in the two-stage process of FIG. 7. For instance, assume that, in the course of executing the two-stage process involving blocks 708 and 710, the pattern-completion engine 126 concludes that none of the extracted categories at a particular level are relevant to the user's query. In response, the application management component 130 aborts the use of the two-stage process, and compares the query vector with each fact vector in the lowest tier of the structured database. Or the application management component 130 attempts to progressively step down the levels of the structured database 106 in the manner described above, at each step performing one or more vector comparison operations. Alternatively, or in addition, other implementations use other search techniques to explore the structured database, such as the Approximate Nearest Neighbor (ANN) technique. Background information on the general topic of ANN matching is available at Li, et al., "Approximate Nearest Neighbor Search on High Dimension Data—Experiments, Analyses, and Improvement," arXiv, Cornell University, arXiv: 1610.02455v1 [cs.DB], Oct. 8, 2016, 26 pages. Alternatively, or in addition, other implementations solicit additional input from the user when encountering low-confidence results.

Generally, the process 702 of FIG. 7 improves the ability of the application system 110 to answer the user's query. For example, assume that the machine-trained model 128 of the pattern-completion engine 126 has not been trained to answer questions regarding a particular subject, e.g., because the subject refers to a recent development, or the training examples otherwise do not capture text pertaining to the subject. The application system 110 overcomes this difficultly by using the pattern-completion engine 126 to extract information from the structured database 106 in a structured manner. In this capacity, the pattern-completion engine 126 functions as an expert interrogator; even though it does not have independent knowledge of a particular subject, it knows how to interrogate the structured database 106 to progressively resolve the question asked by the user. As a further consequence, the application system 110 reduces the risk that the pattern-completion engine 126 will generate a counterfactual or nonsensical response. This is a phenomenon sometimes referred to in the art as "artificial hallucination."

In addition, or alternatively, the application system 110 applies the above strategy to reduce the risk that the pattern-completion engine 126 will generate a socially inappropriate response. For example, assume that the user's question is, "What is a good nickname for my pug dog"?). Assume that the structured database 106 contains factual information about pet names, organized based on different characteristics of the pet (its fur color, fur pattern, body shape, face characteristics, etc.). Assume that the structural database 704 includes knowledge about names that are considered offensive within a particular community. The application management component 130 interrogates both of the structured databases (106, 704) in answering the user's query. That is, the application management component 130 may receive a fact from the structured database 106 that indicates that "Buddy" is a good name for a dog of the pug breed. The application management component 130 consults the database 704 to determine whether this nickname can be considered offensive.

Figure 8:
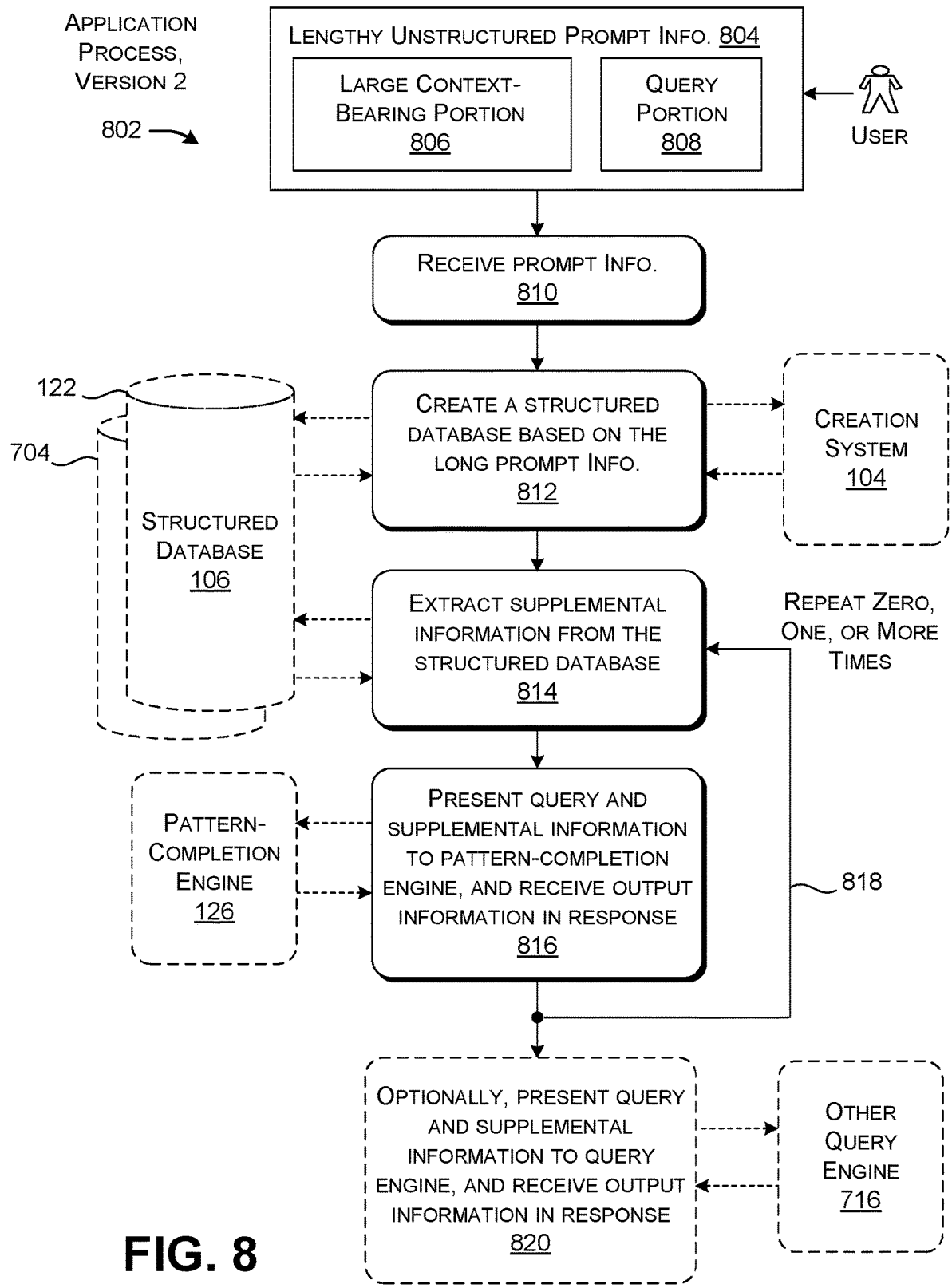
FIG. 8 shows another process performed by the application system of FIG. 1.

FIG. 8 shows another process 802 performed by the application system 110 of FIG. 1. Assume, in this case, that the user inputs a lengthy instance of prompt information 804 to the application system 110. Each environment defines what constitutes "lengthy" with respect to an environment-specific character count threshold value. Further, assume that the prompt information 804 is composed of a large context-bearing portion 806 and a query portion 808. In some examples, the context-bearing portion 806 includes one or more pages of unstructured text on a particular subject. For example, the context-bearing portion 806 may correspond to one or more pages of a book, encyclopedia entry, article, etc. Alternatively, or in addition, the context-bearing portion 806 includes a set of messages composed by one or more users, or a set of blog posts composed by one or more users, etc. The query portion 808 asks a question relating to the context-bearing portion 806. For example, assume that the context-bearing portion 806 includes one thousand Email messages generated by employees of a particular company. The query portion 808 asks a question about a particular project name ("ABC"). Assume that those who work for the company are familiar with the project name, but those who are not employees are not familiar with the project name (or the existence of the project itself). Finally, assume that the pattern-completion engine 126 was not trained on any text fragments relating to the project "ABC," and therefore, acting alone, is unlikely to generate a proper response to the user's question about project "ABC."

FIG. 8 shows a case in which the context-bearing portion 806 is clearly demarcated by the user from the query portion

808. This is true in many situations, as when the user provides a link to a context-bearing document together with a question. In other cases, the user inputs a single body of text without distinguishing what part is the query portion 808 and what part is the context-bearing portion 806. In these cases, the application system 110 interprets the context-bearing portion 806 as the entire single body of text, and also interprets the query portion 808 as the entire single body of text.

In block 810, the application management component 130 receives the prompt information 804. In block 812, the application management component 130 instructs the creation system 104 to create the structured database 106 based on the unstructured text of the context-bearing portion 806 (and optionally also the query portion 808, if these two pieces of information are not distinguished from each other in the input information). In response, the creation system 104 advances through the Email messages sentence-by-sentence in the manner described above with respect to FIGS. 5 and 6, to produce the structured database 106.

Upon completion of the creation flow, the application management component 130 follows the same process 702 as that shown in FIG. 7. That is, in block 814, the application management component 130 extracts supplemental information from the structured database 106 it has just created based on the corpus of Email messages. In block 816, the application management component 130 solicits a response from the pattern-completion engine 126 regarding the query portion 808 and the supplemental information that has been extracted, in block 814, from the structured database 106. The loop 818 indicates that the application management component 130 repeats the above two-step process one or more times, e.g., until facts are extracted from the structured database 106 pertaining to the query portion 808.

In some implementations, the application management component 130 treats the output information generated by the pattern-completion engine 126 as the final result of the process 802. In other cases, in block 820, the application management component 130 submits the query portion 808 and the supplemental information extracted from structured database 106 to the query engine 716, and, in response, receives query output information generated by the query engine 716.

The process 802 of FIG. 8 assists the pattern-completion engine 126 in answering the user's query. Without this assistance, the pattern-completion engine 126 may not be able to properly parse and interpret the lengthy context-bearing portion 806. For example, the pattern-completion engine 126 may have difficulty determining what parts of multi-page prompt information are relevant to the user's query.

FIG. 9 shows a computing system 902 that selectively makes different parts of the unstructured data 108 available to different consuming entities. The creation system 104 converts the unstructured data 108 into the structured database 106 in the manner described above, e.g., with reference to FIGS. 5 and 6. A distribution system 904 then distributes parts of the data items in the structured database 106 to plural data stores (906, 908, 910, . . . ), to provide plural respective structured databases (912, 914, 916, . . . ).

The functionality of the computing system 902 of FIG. 9 will be explained with respect to two different scenarios. In a first scenario, assume that a particular company has plural campuses located in different parts of a country. Further assume that the employees who work at different campuses work on different projects. Further assume that the unstructured data 108 is a corpus of Email messages written or received by employees of the company. Finally, assume that the creation system 104 collects facts about different projects within the company, each of which is identified by an internal project name.

In some implementations, the distribution system 904 stores the content of the structured database 106 that pertains to a first project in a first data store 906 located at a first site. The distribution system 904 stores the content that pertains to second project in a second data store 908 located at a second site. The distribution system 904 stores the content that pertains to a third project in a third data store 908 located at a third site, and so on.

Application systems (918, 920, 922, . . . ) function as retrieval systems provided at the three sites. The application systems (918, 920, 922, . . . ) have access to their locally-cached structured databases (912, 914, 916, . . . ) provided in the data stores (906, 908, 910, . . . ). Each user at a particular site may also interact with the structured database provided at another site. But this interaction incurs a greater latency, compared to the case in which the user interacts with the local structured database associated with the user's site.

In other implementations of the first scenario, the distribution system 904 does not physically distribute different subsets of data; rather, the distribution system 904 selectively grants the users of different sites access to content pertaining to specific projects, but not other projects. For example, the distribution system 904 gives the users of the first site the authority to selectively access to the content associated with the first project (but not other projects).

In the above description, the creation system 104 organizes data items in the unstructured data 108 principally on the basis of the subject matter to which the data items pertain. But as described above, other implementations of the creation system 104 take into consideration any factor(s) for discriminating among data items, not necessarily a subject matter-related factor, or not necessarily only a subject matter-related factor. For instance, in other implementations, the creation system 104 partitions data items in the unstructured data 108 based on a consideration of the locations at which the data items are most frequently used. Thus, if records pertaining to a project "ABC" are most frequently requested and consumed at the first location, then the creation system 104 and the distribution system 904 will allocate these data items to the data store 906 of the first location.

In a second scenario, assume that an individual user or other entity collects a large amount of personal data in unstructured form over an extended period of time. That personal data may include different items-of-interest, including finance-related items-of-interest, family-related items-of-interest, education-related items-of-interest, and so on. Assume that the user wishes to selectively make only one kind of item-of-interest available to a particular consumer of this information. For example, assume that the user wishes to allow his or her accountant to access and interact with the finance-related items-of-interest, but not family-related items-of-interest. The computing system 902 accommodates this need using the technology set forth herein.

More specifically, in some implementations, the user inputs filter information that specifies the kinds of items-of-interest which are to be made available to a particular consumer. In response, the creation system 104 selectively extracts those items-of-interest and associated categories that are pertinent to the user's specified filtering information. This yields a custom structured database that is focused on the particular items-of-interest (and associated categories)

specified in the filtering information. The distribution system 904 then makes this custom structured database available to the authorized consumer, e.g., by sharing a link to this database with the consumer, and/or transferring the database to the consumer. In some cases, the user creates plural custom databases in advance of requests to access this information by different consumers with different authorization rights. In other cases, the user instructs the creation system 104 to dynamically create a custom database when a need by an entity arises to consume this data.

Figure 10:
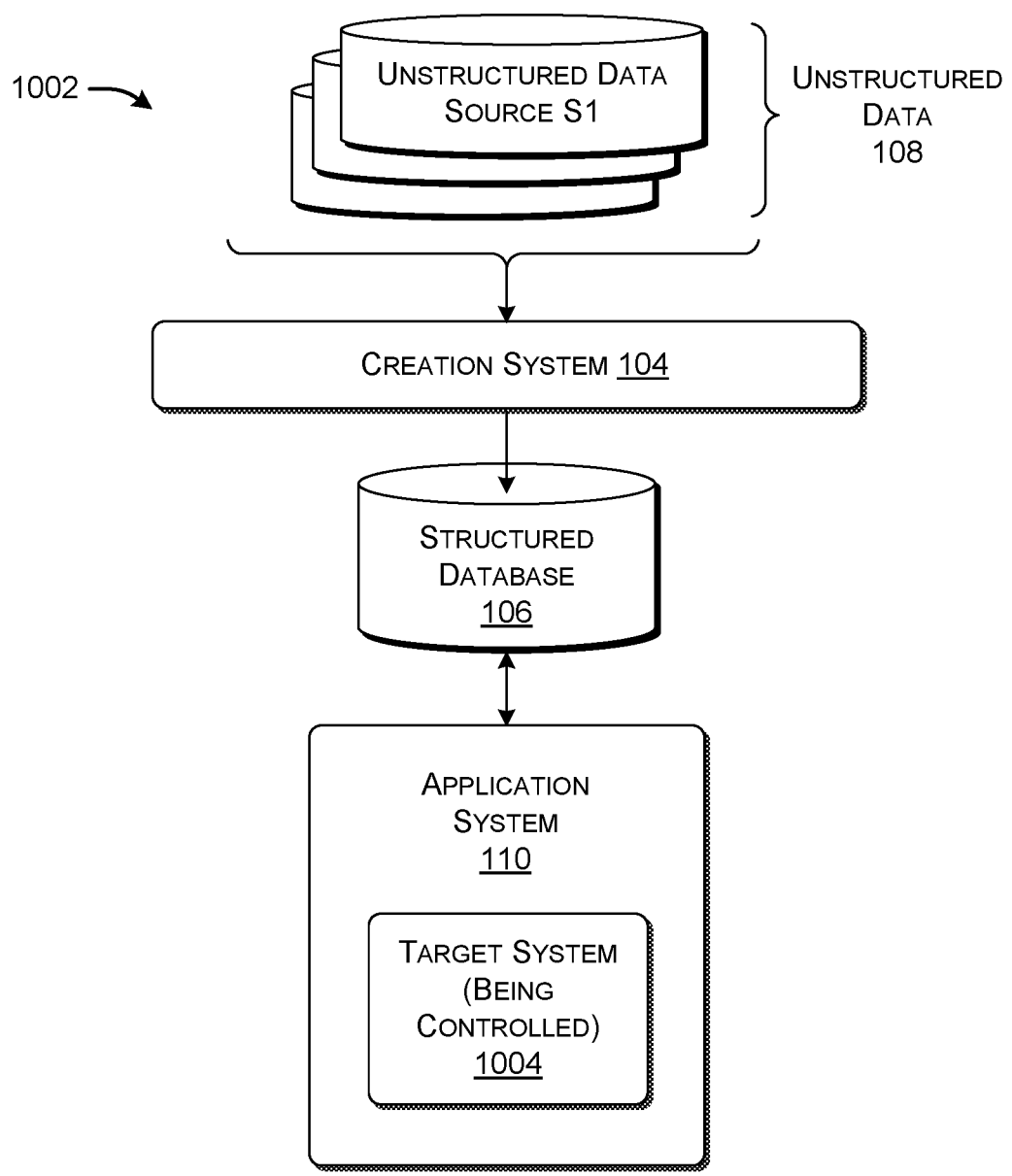
FIG. 10 shows a computing system that uses the functionality of FIG. 1 to perform a control function.

FIG. 10 shows a computing system 1002 in which the functionality of FIG. 1 is used to control any target system 1004. The creation system 104 converts the unstructured data 108 into the structured database 106 in the manner described above. The application system 110 relies on the structured database 106 to control the target system 1004. In one example, the target system 1004 is a device, vehicle, appliance, etc. that responds to a user's voice commands. The application system 110 uses the pattern-completion engine 126 in conjunction with the structured database 106 to help properly interpret the user's commands. In another example, the target system 1004 is a security mechanism that interrogates the user with the goal of determining whether the user should be properly admitted to a physical space, or whether the user should be allowed to access a particular computing system. The application system 110 uses the pattern-completion engine 126 in conjunction with the structured database 106 to evaluate the credibility of the user.

Figure 11:
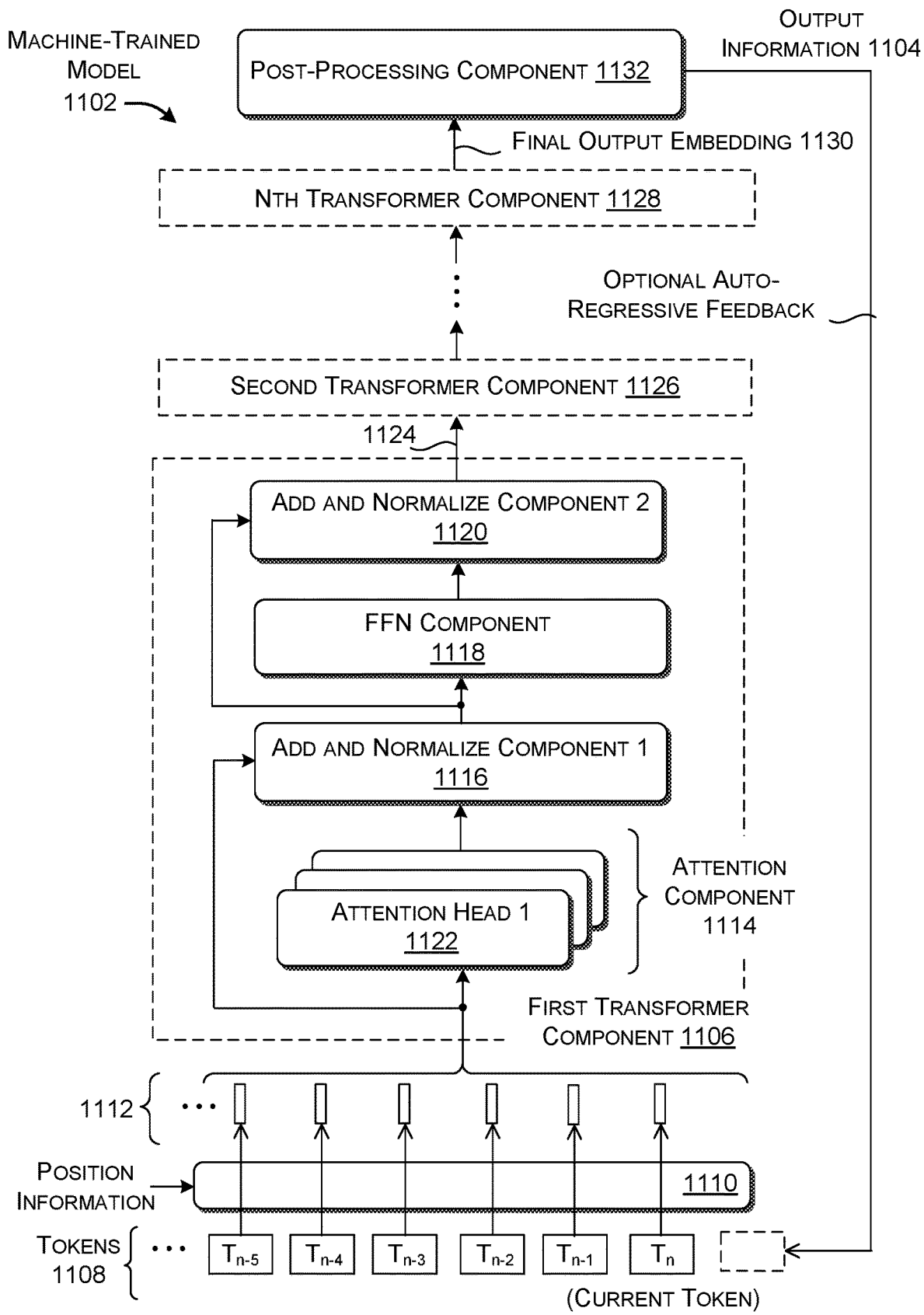
FIG. 11 shows one implementation of a machine-trained model used in the computing system of FIG. 1.

FIG. 11 shows one implementation of a machine-trained pattern-completion model 1102 ("model" for brevity) for use in the computing system 102 of FIG. 1. That is, the model 1102 represents an implementation of the machine-trained model 118 used by the creation system 104, and/or the machine-trained model 128 used by the application system 110 (which may be the same model as that used in the creation system 104).

The model 1102 maps initial prompt information to a final output information 1104. The model 1102 is composed, in part, of a pipeline of transformer components, including a first transformer component 1106. FIG. 11 provides details regarding one way to implement the first transformer component 1106. Although not specifically illustrated, other transformer components of the model 1102 have the same architecture and perform the same functions as the first transformer component 1106 (but are governed by separate sets of weights).

The model 1102 commences with the receipt of the prompt information. The prompt information includes a series of linguistic tokens 1108. As used herein, a "token" or "text token" refers to a unit of text having any granularity, such as an individual word, a word fragment produced by byte pair encoding (BPE), a character n-gram, a word fragment identified by the WordPiece algorithm, etc. To facilitate explanation, assume that each token corresponds to a complete word or other unit (e.g., a measurement by a sensing device, or a formatting value).

Next, an embedding component 1110 maps the sequence of tokens 1108 into respective embedding vectors. For example, the embedding component 1110 produces one-hot vectors that describe the tokens, and then uses a machine-trained linear transformation to map the one-hot vectors into the embedding vectors. The embedding component 1110 then adds position information to the respective embedding vectors, to produce position-supplemented embedded vectors 1112. The position information added to each embedding vector describes the embedding vector's position in the sequence of embedding vectors.

The first transformer component 1106 operates on the position-supplemented embedding vectors 1112. In some implementations, the first transformer component 1106 includes, in order, an attention component 1114, a first add-and-normalize component 1116, a feed-forward neural network (FFN) component 1118, and a second add-and-normalize component 1120.

The attention component 1114 performs attention analysis using the following equation:

$$attn(Q, K, V) = \text{Softmax}\left(\frac{QK^T}{\sqrt{d}}\right)V. \quad (1)$$

The attention component 1114 produces query information Q by multiplying the position-supplemented embedded vectors 1112 (or, in some applications, just a last position-supplemented embedding vector associated with a last-received token) by a query weighting matrix $W^Q$. Similarly, the attention component 1114 produces key information K and value information V by multiplying the position-supplemented embedding vectors by a key weighting matrix $W^K$ and a value weighting matrix $W^V$, respectively. To execute Equation (1), the attention component 1114 takes the dot product of Q with the transpose of K, and then divides the dot product by a scaling factor $\sqrt{d}$, to produce a scaled result. The symbol d represents the dimensionality of Q and K. The attention component 1114 takes the Softmax (normalized exponential function) of the scaled result, and then multiplies the result of the Softmax operation by V, to produce attention output information. More generally stated, the attention component 1114 determines how much emphasis should be placed on parts of the input information when interpreting other parts of the input information. In some cases, the attention component 1114 is said to perform masked attention insofar as the attention component 1114 masks output token information that, at any given time, has not yet been determined. Background information regarding the general concept of attention is provided in Vaswani, et al., "Attention Is All You Need," in 31st Conference on Neural Information Processing Systems (NIPS 2017), 2017, 11 pages.

Note that FIG. 11 shows that the attention component 1114 is composed of plural attention heads, including a representative attention head 1122. Each attention head performs the computations specified by Equation (1), but with respect to a particular representational subspace that is different than the subspaces of the other attention heads. To accomplish this operation, the attention heads perform the computations described above using different respective sets of query, key, and value weight matrices. Although not shown, the attention component 1114 concatenates the output results of the attention component's separate attention heads, and then multiplies the results of this concatenation by another weight matrix $W^O$.

The add-and-normalize component 1116 includes a residual connection that combines (e.g., sums) input information fed to the attention component 1114 with the output information generated by the attention component 1114. The add-and-normalize component 1116 then normalizes the output information generated by of the residual connection, e.g., by normalizing values in the output information based on the mean and standard deviation of those values. The other add-and-normalize component 1120 performs the same functions as the first-mentioned add-and-normalize component 1116.

The FFN component 1118 transforms input information to output information using a feed-forward neural network having any number of layers. In some implementations, the FFN component 1118 is a two-layer network that performs its function using the following equation:

$$FNN(x) = \max(0, xW_{fnn1} + b_1)W_{fnn2} + b_2. \tag{2}$$

The symbols $W_{fnn1}$ and $W_{fnn2}$ refer to two weight matrices used by the FFN component 1118, having reciprocal shapes of $(d, d_{fnn})$ and $(d_{fnn}, d)$, respectively. The symbols $b_1$ and $b_2$ represent bias values.

The first transformer component 1106 produces an output embedding 1124. A series of other transformer components (1126, ..., 1128) perform the same functions as the first transformer component 1106, each operating on an output embedding produced by its immediately preceding transformer component. Each transformer component uses its own level-specific set of machine-trained weights. The final transformer component 1128 in the model 1102 produces a final output embedding 1130.

A post-processing component 1132 performs post-processing operations on the final output embedding 1130, to produce the final output information 1104. In one case, for instance, the post-processing component 1132 performs a machine-trained linear transformation on the final output embedding 1130, and processes the result of this transformation using a Softmax component (not shown).

In some implementations, the model 1102 operates in an auto-regressive manner. To operate in this way, the post-processing component 1132 uses the Softmax operation to predict a next token (or, in some cases, a set of the most probable next tokens). The model 1102 then appends the next token to the end of the sequence of input tokens 1108, to provide an updated sequence of tokens. In a next pass, the model 1102 processes the updated sequence of tokens to generate a next output token. The model 1102 repeats the above process until it generates a specified stop token.

Figure 12:
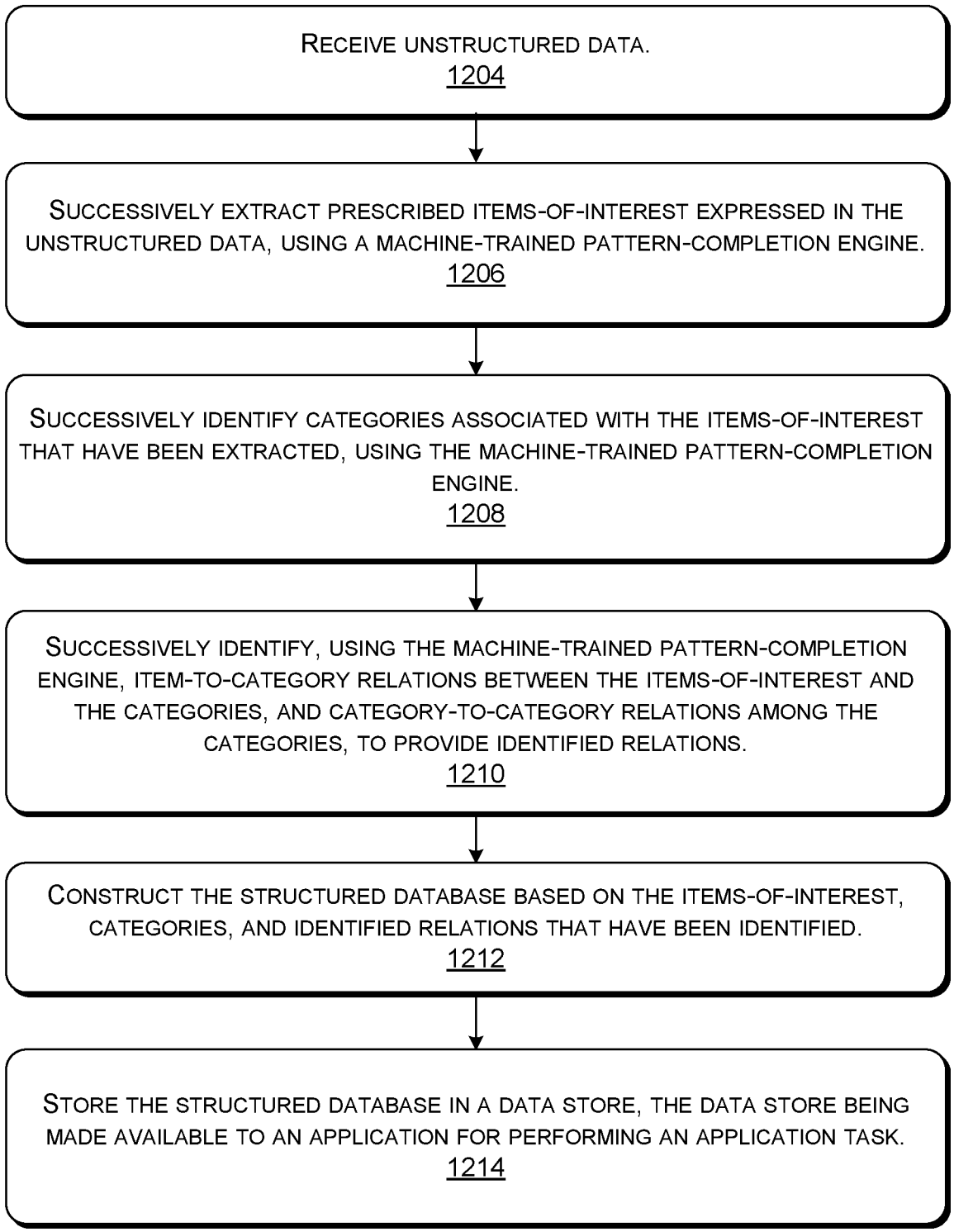
FIG. 12 shows a process that represents one manner of operation of the creation system of FIG. 1.

FIG. 12 shows a process 1202 for creating and utilizing a structured database (e.g., the structured database 105). In block 1204, the creation system (e.g., 104) receives unstructured data (e.g., 108). In block 1206, the creation system successively extracts prescribed items-of-interest expressed in the unstructured data, using a machine-trained pattern-completion engine (e.g., 116). In block 1208, the creation system successively identifies categories associated with the items-of-interest that have been extracted, using the machine-trained pattern-completion engine. In block 1210, the creation system successively identifies, using the machine-trained pattern-completion engine, item-to-category relations between the items-of-interest and the categories, and category-to-category relations among the categories, to provide identified relations. In block 1212, the creation system constructs the structured database based on the items-of-interest, categories, and identified relations that have been identified. In block 1214, the creation system stores the structured database in a data store (e.g., 122), the data store being made available to an application for performing an application task.

Figure 13:
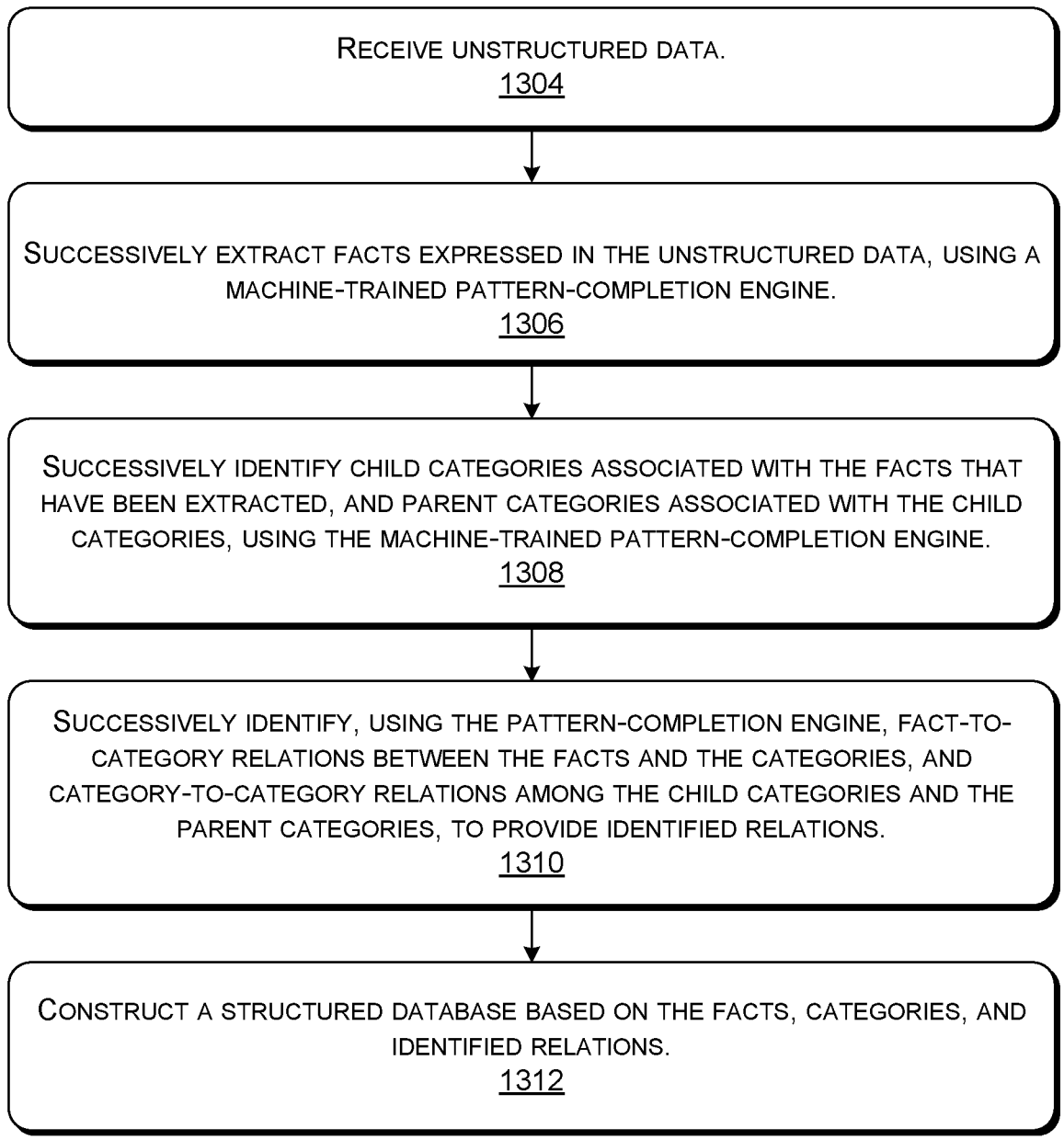
FIG. 13 shows a process that represents a more detailed implementation of the process of FIG. 12.

FIG. 13 shows a process 1302 that represents a more detailed implementation of the process 1202 of FIG. 12. In block 1304, a creation system (e.g., 104) receives unstructured data (e.g., 108). In block 1306, the creation system successively extracts facts expressed in the unstructured data, using a machine-trained pattern-completion engine (e.g., 116). In block 1308, the creation system successively identifies child categories associated with the facts that have been extracted, and parent categories associated with the child categories, using the machine-trained pattern-completion engine. In block 1310, the creation system successively identifies, using the pattern-completion engine, fact-to-category relations between the facts and the categories, and category-to-category relations among the child categories and parent categories, to provide identified relations. In block 1312, the creation system constructs a structured database (e.g., 106) based on the facts, categories, and identified relations.

Figure 14:
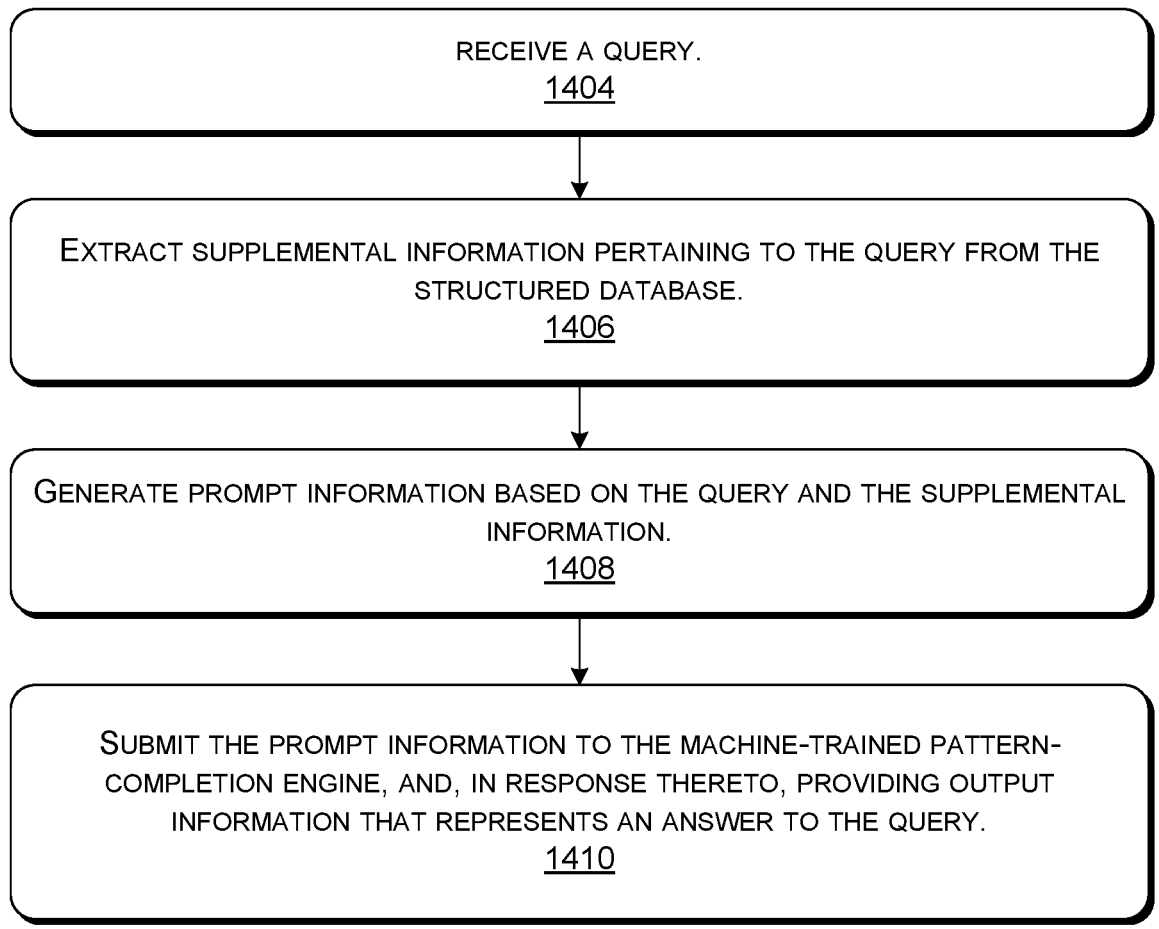
FIG. 14 shows a process that represents one manner of operation of the application system of FIG. 1.

FIG. 14 shows a process 1402 for interacting with structured database (e.g., 106). In block 1404, an application system (e.g., 110) receive a query. In block 1406, the application system extracts supplemental information pertaining to the query from the structured database. In block 1408, the application system generates prompt information based on the query and the supplemental information. In block 1410, the application system submits the prompt information to a machine-trained pattern-completion engine (e.g., 126), and, in response thereto, provides output information that represents an answer to the query.

FIG. 15 shows computing equipment 1502 that, in some implementations, is used to implement the computing system 102 of FIG. 1 (or the computing system 902 of FIG. 9, or the computing system 1002 of FIG. 10). The computing equipment 1502 includes a set of local devices 1504 coupled to a set of servers 1506 via a computer network 1508. Each local device corresponds to any type of computing device, including any of a desktop computing device, a laptop computing device, a handheld computing device of any type (e.g., a smartphone or a tablet-type computing device), a mixed reality device, an intelligent appliance, a wearable computing device (e.g., a smart watch), an Internet-of-Things (IoT) device, a gaming system, an immersive "cave," a media device, a vehicle-borne computing system, any type of robot computing system, a computing system in a manufacturing system, etc. In some implementations, the computer network 1508 is implemented as a local area network, a wide area network (e.g., the Internet), one or more point-to-point links, or any combination thereof.

The dashed-line box in FIG. 15 indicates that the functionality of the computing systems (102, 902, 1002) is capable of being spread across the local devices 1504 and/or the servers 1506 in any manner. For instance, in some cases, each local commuting device, or a group of affiliated local computing devices, implements the entirety the computing system 102. In other implementations, one or data-processing operations are delegated to an online resource provided by the servers 1506. For example, in some implementations, the pattern-completion engines (116, 126) are implemented by the servers 1506.

FIG. 16 shows a computing system 1602 that, in some implementations, is used to implement any aspect of the mechanisms set forth in the above-described figures. For instance, in some implementations, the type of computing system 1602 shown in FIG. 16 is used to implement any local computing device or any server shown in FIG. 15. In all cases, the computing system 1602 represents a physical and tangible processing mechanism.

The computing system 1602 includes a processing system 1604 including one or more processors. The processor(s) include one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any processor corresponds to a general-purpose processing unit or an application-specific processor unit.

The computing system 1602 also includes computer-readable storage media 1606, corresponding to one or more computer-readable media hardware units. The computer-readable storage media 1606 retains any kind of information 1608, such as machine-readable instructions, settings, model weights, and/or other data. In some implementations, the computer-readable storage media 1606 includes one or more solid-state devices, one or more magnetic hard disks, one or more optical disks, magnetic tape, etc. Any instance of the computer-readable storage media 1606 uses any technology for storing and retrieving information. Further, any instance of the computer-readable storage media 1606 represents a fixed or removable unit of the computing system 1602. Further, any instance of the computer-readable storage media 1606 provides volatile and/or non-volatile retention of information.

More generally, any of the storage resources described herein, or any combination of the storage resources, is to be regarded as a computer-readable medium. In many cases, a computer-readable medium represents some form of physical and tangible entity. The term computer-readable medium also encompasses propagated signals, e.g., transmitted or received via a physical conduit and/or air or other wireless medium. However, the specific term "computer-readable storage medium" or "storage device" expressly excludes propagated signals per se in transit, while including all other forms of computer-readable media; a computer-readable storage medium or storage device is "non-transitory" in this regard.

The computing system 1602 utilizes any instance of the computer-readable storage media 1606 in different ways. For example, in some implementations, any instance of the computer-readable storage media 1606 represents a hardware memory unit (such as random access memory (RAM)) for storing information during execution of a program by the computing system 1602, and/or a hardware storage unit (such as a hard disk) for retaining/archiving information on a more permanent basis. In the latter case, the computing system 1602 also includes one or more drive mechanisms 1610 (such as a hard drive mechanism) for storing and retrieving information from an instance of the computer-readable storage media 1606.

In some implementations, the computing system 1602 performs any of the functions described above when the processing system 1604 executes computer-readable instructions stored in any instance of the computer-readable storage media 1606. For instance, in some implementations, the computing system 1602 carries out computer-readable instructions to perform each block of the processes described in with reference to FIGS. 12-14. FIG. 16 generally indicates that hardware logic circuitry 1612 includes any combination of the processing system 1604 and the computer-readable storage media 1606.

In addition, or alternatively, the processing system 1604 includes one or more other configurable logic units that perform operations using a collection of logic gates. For instance, in some implementations, the processing system 1604 includes a fixed configuration of hardware logic gates, e.g., that are created and set at the time of manufacture, and thereafter unalterable. In addition, or alternatively, the processing system 1604 includes a collection of programmable hardware logic gates that are set to perform different application-specific tasks. The latter category of devices includes Programmable Array Logic Devices (PALs), Generic Array Logic Devices (GALs), Complex Programmable Logic Devices (CPLDs), Field-Programmable Gate Arrays (FPGAs), etc. In these implementations, the processing system 1604 effectively incorporates a storage device that stores computer-readable instructions, insofar as the configurable logic units are configured to execute the instructions and therefore embody or store these instructions.

In some cases (e.g., in the case in which the computing system 1602 represents a user computing device), the computing system 1602 also includes an input/output interface 1614 for receiving various inputs (via input devices 1616), and for providing various outputs (via output devices 1618). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some implementations, one particular output mechanism includes a display device 1620 and an associated graphical user interface presentation (GUI) 1622. The display device 1620 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 1602 also includes one or more network interfaces 1624 for exchanging data with other devices via one or more communication conduits 1626. One or more communication buses 1628 communicatively couple the above-described units together.

The communication conduit(s) 1626 is capable of being implemented in any manner, e.g., by a local area computer network, a wide area computer network (e.g., the Internet), point-to-point connections, or any combination thereof. The communication conduit(s) 1626 include any combination of hardwired links, wireless links, routers, gateway functionality, name servers, etc., governed by any protocol or combination of protocols.

FIG. 16 shows the computing system 1602 as being composed of a discrete collection of separate units. In some cases, the collection of units corresponds to discrete hardware units provided in a computing device chassis having any form factor. FIG. 16 shows illustrative form factors in its bottom portion. In other cases, the computing system 1602 includes a hardware logic unit that integrates the functions of two or more of the units shown in FIG. 1. For instance, in some implementations, the computing system 1602 includes a system on a chip (SoC or SOC), corresponding to an integrated circuit that combines the functions of two or more of the units shown in FIG. 16.

The following summary provides a set of illustrative examples of the technology set forth herein.

(A1) According to a first aspect, a computer-implemented method (e.g., 1202) is described for creating and utilizing a structured database (e.g., 106). The method includes: receiving (e.g., 1204) unstructured data (108); successively extracting (1206) prescribed items-of-interest expressed in the unstructured data, using a machine-trained pattern-completion engine (e.g., 116); successively identifying (1208) categories associated with the items-of-interest that have been extracted, using the machine-trained pattern-completion engine; successively identifying (e.g., 1210), using the machine-trained pattern-completion engine, item-to-category relations between the items-of-interest and the categories, and category-to-category relations among the categories, to provide identified relations; constructing (e.g., 1212) the structured database based on the items-of-interest, categories, and identified relations that have been identified; and storing (e.g., 1214) the structured database in a data store (e.g., 122), the data store being made available to an application for performing an application task.

(A2) According to some implementations of the method of A1, the unstructured data corresponds to an instance of prompt information submitted to the machine-trained pattern-completion engine.

(A3) According to some implementations of the methods of A1 or A2, the items-of-interest are facts expressed in identified parts of the unstructured data.

(A4) According to some implementations of any of the methods of A1-A3, a use of the machine-trained pattern-completion engine in creating the structured database involves: generating prompt information, the prompt information expressing: (a) a portion-of-interest that identifies an aspect of the unstructured data that is currently an object of analysis; and (b) a text-based narrative that sets forth how the machine-trained pattern-completion engine is to analyze the portion-of-interest; and submitting the prompt information to the machine-trained pattern-completion engine, and, in response thereto, receiving output information.

(A5) According to some implementations of the method of A4, a particular portion-of-interest identifies a portion of text in the unstructured data, and the text-based narrative expresses a goal of identifying items-of-interest in the portion of text.

(A6) According to some implementations of the method of A4, a particular portion-of-interest identifies a set of items-of-interest, wherein the text-based narrative expresses a goal of identifying categories associated with the set of items-of-interest.

(A7) According to some implementations of the method of A4, a particular portion-of-interest identifies a set of child categories, wherein the text-based narrative expresses a goal of identifying parent categories associated with the set of child categories.

(A8) According to some implementations of the method of A4, a particular portion-of-interest identifies a set of items-of-interest, wherein the text-based narrative expresses a goal of replacing one or more pronouns in the set of items-of-interest with one or more corresponding entity names.

(A9) According to some implementations of the method of A4, a particular portion-of-interest identifies a set of items-of-interest and/or categories, wherein the text-based narrative expresses a goal of removing duplicate items-of-interest and/or duplicate categories in the set.

(A10) According to some implementations of the method of A4, a particular portion-of-interest identifies a set of items-of-interest and/or categories, wherein the text-based narrative expresses a goal of identifying item-to-category relations and/or category-to-category relations in the set.

(A11) According to some implementations of any of the methods of A1-A10, the structured database is expressed as a directed graph, the directed graph having leaf nodes associated with the identified items-of-interest, and parent and other nodes associated with the identified categories.

(A12) According to some implementations of the method of A11, the method further includes associating semantic index information with each node in the directed graph.

(A13) According to some implementations of any of the methods of A1-A12, the structured database is a distributed database having first content stored in a first data store at a first location, and having second content stored in a second data store at a second location.

(A14) According to some implementations of any of the methods of A1-A13, the unstructured data includes plural different kinds of items-of-interest. The computer-implemented method further includes: receiving text-based filter information that specifies a particular kind of items-of-interest to extract, the successively extracting using the machine-trained pattern-completion engine to retrieve the particular kind of items-of-interest from the unstructured data, based on the text-based filter information; and selectively making the particular kind of items-of-interest available to an entity having authorization to interact with the particular kind of items-of-interest.

(A15) According to some implementations of any of the methods of A1-A14, the application task involves: receiving a query; searching the structured database for a data item that matches the query; and returning a result that identifies the data item that matches the query.

(A16) According to some implementations of any of the methods of A1-A15, the application task involves: receiving a query; extracting supplemental information pertaining to the query from the structured database; generating prompt information based on the query and the supplemental information; and submitting the prompt information to the machine-trained pattern-completion engine, and, in response thereto, providing query-stage output information that represents an answer to the query.

(B1) According to a first aspect, a computer-implemented method (e.g., 1402) is described for providing content. The method includes: receiving (e.g., 1404) a query; extracting (e.g., 1406) supplemental information pertaining to the query from a structured database (e.g., 106); generating (e.g., 1408) prompt information based on the query and the supplemental information; and submitting (e.g., 1410) the prompt information to a machine-trained pattern-completion engine (e.g., 126), and, in response thereto, providing output information that represents an answer to the query.

(B2) According to some implementations of the method of B1, the extracting supplemental information involves using the machine-trained pattern-completion engine to successively retrieve information of increasing specificity from the structured database, until reaching at least one item-of-interest in the structured database that is relevant to the query.

(B3) According to some implementations of the method of B1 or B2, the unstructured data is text provided in the query itself.

(C1) According a second aspect, another computer-implemented method (e.g., 1302) is described for creating and utilizing a structured database (e.g., 106). The method includes: receiving (e.g., 1304) unstructured data (e.g., 108); successively extracting (e.g., 1306)

facts expressed in the unstructured data, using a machine-trained pattern-completion engine (e.g., 116); successively identifying (e.g., 1308) child categories associated with the facts that have been extracted, and parent categories associated with the child categories, using the machine-trained pattern-completion engine; successively identifying (e.g., 1310), using the pattern-completion engine, fact-to-category relations between the facts and the categories, and category-to-category relations among the categories, to provide identified relations; and constructing (e.g., 1312) a structured database based on the facts, child categories, parent categories, and identified relations.

In yet another aspect, some implementations of the technology described herein include a computing system (e.g., the computing system 1602) that includes a processing system (e.g., the processing system 1604) having a processor. The computing system also includes a storage device (e.g., the computer-readable storage media 1606) for storing computer-readable instructions (e.g., information 1608). The processing system executes the computer-readable instructions to perform any of the methods described herein (e.g., any individual method of the methods of A1-A16, B1-B3, or C1).

In yet another aspect, some implementations of the technology described herein include a computer-readable storage medium (e.g., the computer-readable storage media 1606) for storing computer-readable instructions (e.g., the information 1608). A processing system (e.g., the processing system 1604) executes the computer-readable instructions to perform any of the operations described herein (e.g., the operation in any individual method of the methods of A1-A16, B1-B3, or C1).

More generally stated, any of the individual elements and steps described herein are combinable into any logically consistent permutation or subset. Further, any such combination is capable of being be manifested as a method, device, system, computer-readable storage medium, data structure, article of manufacture, graphical user interface presentation, etc. The technology is also expressible as a series of means-plus-format elements in the claims, although this format should not be considered to be invoked unless the phrase "means for" is explicitly used in the claims.

As to terminology used in this description, the phrase "configured to" encompasses various physical and tangible mechanisms for performing an identified operation. The mechanisms are configurable to perform an operation using the hardware logic circuitry 1612 of FIG. 16. The term "logic" likewise encompasses various physical and tangible mechanisms for performing a task. For instance, each processing-related operation illustrated in the flowcharts of FIGS. 12-14 corresponds to a logic component for performing that operation.

This description may have identified one or more features as optional. This type of statement is not to be interpreted as an exhaustive indication of features that are to be considered optional; generally, any feature is to be considered as optional, although not explicitly identified in the text, unless otherwise noted. Further, any mention of a single entity is not intended to preclude the use of plural such entities; similarly, a description of plural entities in the specification is not intended to preclude the use of a single entity. As such, a statement that an apparatus or method has a feature X does not preclude the possibility that it has additional features. Further, any features described as alternative ways of carrying out identified functions or implementing identified mechanisms are also combinable together in any combination, unless otherwise noted.

In terms of specific terminology, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of" or the like, is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. The phrase "any combination thereof" refers to any combination of two or more elements in a list of elements. Further, the terms "comprising," "including," and "having" are open-ended terms that are used to identify at least one part of a larger whole, but not necessarily all parts of the whole. A "set" includes zero members, one member, or more than one member. Finally, the terms "exemplary" or "illustrative" refer to one implementation among potentially many implementations.

In closing, the functionality described herein is capable of employing various mechanisms to ensure that any user data is handled in a manner that conforms to applicable laws, social norms, and the expectations and preferences of individual users. For example, the functionality is configurable to allow a user to expressly opt in to (and then expressly opt out of) the provisions of the functionality. The functionality is also configurable to provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for creating and utilizing a structured database, comprising:
receiving unstructured data;
successively extracting prescribed items-of-interest expressed in the unstructured data, using a machine-trained pattern-completion engine;
successively identifying categories associated with the items-of-interest that have been previously extracted, using the machine-trained pattern-completion engine;
successively identifying, using the machine-trained pattern-completion engine, item-to-category relations between the items-of-interest that have been previously extracted and the categories that have been previously identified and category-to-category relations among the categories that have been previously identified, to provide identified relations;

constructing the structured database based on the items-of-interest, categories, and identified relations that have been identified; and storing the structured database in a data store, the data store being made available to an application for performing an application task, the structured database being expressed as a directed graph, the directed graph having leaf nodes associated with the identified items-of-interest, and parent and other nodes associated with the identified categories.

2. The computer-implemented method of claim 1, wherein the unstructured data corresponds to an instance of prompt information submitted to the machine-trained pattern-completion engine.

3. The computer-implemented method of claim 1, wherein the items-of-interest are facts expressed in identified parts of the unstructured data.

4. The computer-implemented method of claim 1, wherein use of the machine-trained pattern-completion engine in creating the structured database includes plural passes, wherein one of the plural passes involves:

generating prompt information, the prompt information expressing: (a) a portion-of-interest that identifies an aspect of the unstructured data that is currently an object of analysis; and (b) a text-based narrative that sets forth how the machine-trained pattern-completion engine is to analyze the portion-of-interest; and submitting the prompt information to the machine-trained pattern-completion engine, and, in response thereto, receiving output information.

5. The computer-implemented method of claim 4, wherein a particular portion-of-interest identifies a portion of text in the unstructured data, and the text-based narrative expresses a goal of identifying items-of-interest in the portion of text.

6. The computer-implemented method of claim 4, wherein a particular portion-of-interest identifies a set of items-of-interest, and wherein the text-based narrative expresses a goal of identifying categories associated with the set of items-of-interest.

7. The computer-implemented method of claim 4, wherein a particular portion-of-interest identifies a set of child categories, and wherein the text-based narrative expresses a goal of identifying parent categories associated with the set of child categories.

8. The computer-implemented method of claim 4, wherein a particular portion-of-interest identifies a set of items-of-interest, and wherein the text-based narrative expresses a goal of replacing one or more pronouns in the set of items-of-interest with one or more corresponding entity names.

9. The computer-implemented method of claim 4, wherein a particular portion-of-interest identifies a set of items-of-interest and/or categories, and wherein the text-based narrative expresses a goal of removing duplicate items-of-interest and/or duplicate categories in the set.

10. The computer-implemented method of claim 4, wherein a particular portion-of-interest identifies a set of items-of-interest and/or categories, and wherein the text-based narrative expresses a goal of identifying item-to-category relations and/or category-to-category relations in the set.

11. The computer-implemented method of claim 1, further including associating semantic index information with each node in the directed graph.

12. The computer-implemented method of claim 1, wherein the structured database is a distributed database having first content stored in a first data store at a first location, and having second content stored in a second data store at a second location.

13. The computer-implemented method of claim 1, wherein the unstructured data includes plural different kinds of items-of-interest, and wherein the computer-implemented method further includes:

receiving text-based filter information that specifies a particular kind of items-of-interest to extract, the successively extracting using the machine-trained pattern-completion engine to retrieve the particular kind of items-of-interest from the unstructured data, based on the text-based filter information; and selectively making the particular kind of items-of-interest available to an entity having authorization to interact with the particular kind of items-of-interest.

14. The computer-implemented method of claim 1, wherein the application task involves:

receiving a query;

searching the structured database for a data item that matches the query; and returning a result that identifies the data item that matches the query.

15. The computer-implemented method of claim 1, wherein the application task involves:

receiving a query;

extracting supplemental information pertaining to the query from the structured database;

generating prompt information based on the query and the supplemental information; and submitting the prompt information to the machine-trained pattern-completion engine, and, in response thereto, providing query-stage output information that represents an answer to the query.

16. A computing system for providing content, comprising:

a store for storing computer-readable instructions and a structured database, the structured database being expressed as a directed graph;

a processing system for executing the computer-readable instructions to perform operations that include:

receiving a query;

extracting supplemental information pertaining to the query from the structured database in plural passes using a machine-trained pattern-completion engine, the extracting including successively retrieving information of increasing specificity from the structured database by progressively moving down levels of the structured database, until reaching at least one item-of-interest in the structured database that is relevant to the query;

generating prompt information based on the query and the supplemental information; and submitting the prompt information to the machine-trained pattern-completion engine, and, in response thereto, providing output information that represents an answer to the query.

17. The computing system of claim 16, wherein the structured database is created based on unstructured text provided in the query itself.

18. A computer-readable storage medium for storing computer-readable instructions, a processing system executing the computer-readable instructions to perform operations, the operations comprising:
- receiving a text portion of a section-of-interest in unstructured data;
- guiding a prompt-generating process and a pattern-completion engine to extract facts from the text portion;
- after the facts are identified, directing the prompt-generating process and the pattern-completion engine to identify the categories associated with the section-of-interest;
- after the categories are identified, directing the prompt-generating process and the pattern-completion engine to identify links between the facts and the categories; and
- constructing a structured database that is expressed as a directed graph, the directed graph having fact nodes associated with the facts, parent nodes associated with the categories, and edges that connect the fact nodes to the category nodes, the facts nodes being reachable via the parent nodes,
- the facts, categories, and links being collected by the prompt-generating process and the pattern-completion engine in plural passes.

19. The computer-readable storage medium of claim 18, wherein the categories are identified in response to a determination that facts have been extracted from all text portions of the section-of-interest.

20. The computer-readable storage medium of claim 18, wherein the operations further comprise guiding the prompt-generating process and the pattern-completion engine to revise the facts prior to identifying the categories.

* * * * *